(12) United States Patent
Duerstock et al.

(10) Patent No.: US 11,382,420 B2
(45) Date of Patent: Jul. 12, 2022

(54) MOTORIZED OVERBED TABLE FOR BEDS AND RECLINERS

(71) Applicants: Prehensile Technologies LLC, West Lafayette, IN (US); Purdue Research Foundation, West Lafayette, IN (US)

(72) Inventors: Bradley S. Duerstock, West Lafayette, IN (US); Jeffery Ackerman, Arvada, CO (US)

(*) Notice: Subject to any disclaimer, the term of this patent is extended or adjusted under 35 U.S.C. 154(b) by 133 days.

(21) Appl. No.: 16/422,475

(22) Filed: May 24, 2019

(65) Prior Publication Data

US 2019/0357671 A1    Nov. 28, 2019

Related U.S. Application Data

(60) Provisional application No. 62/675,963, filed on May 24, 2018.

(51) Int. Cl.
*A47B 23/04* (2006.01)
*A47B 9/16* (2006.01)
*B62D 9/00* (2006.01)
*B60K 7/00* (2006.01)

(52) U.S. Cl.
CPC .............. *A47B 23/046* (2013.01); *A47B 9/16* (2013.01); *A47B 2023/047* (2013.01); *B60K 7/0007* (2013.01); *B62D 9/00* (2013.01)

(58) Field of Classification Search
CPC ... A47B 23/046; A47B 2023/047; A47B 9/16; B60K 7/0007; B62D 9/00
See application file for complete search history.

(56) References Cited

U.S. PATENT DOCUMENTS

| | | | | |
|---|---|---|---|---|
| 8,316,777 | B1* | 11/2012 | Rosing | A47B 23/046 108/50.01 |
| 9,022,154 | B2* | 5/2015 | Sato | A63C 17/12 180/181 |
| 10,295,311 | B1* | 5/2019 | Trubacek | A47B 13/081 |
| 2009/0101047 | A1* | 4/2009 | Mulaw | A47B 23/046 108/13 |
| 2012/0312196 | A1* | 12/2012 | Newkirk | H02J 50/12 108/50.02 |
| 2013/0200579 | A1* | 8/2013 | Abernethy | B62B 5/04 280/6.15 |
| 2017/0099943 | A1* | 4/2017 | Joshi | A47B 9/04 |
| 2018/0370582 | A1* | 12/2018 | Sato | A63C 17/12 |

* cited by examiner

*Primary Examiner* — Matthew W Ing
(74) *Attorney, Agent, or Firm* — Gutwein Law; Tyler B. Droste

(57) ABSTRACT

An overbed table apparatus comprising a rail system and a first arm coupled to the rail system, comprising an extension portion configured to move along a first axis. An end effector can be coupled to the extension portion, wherein the end effector is perpendicularly oriented from the first arm. A first motor assembly can be configured to actuate a first actuator, wherein the first end of the first actuator is coupled to a first end of the first arm and the second end of the first actuator is coupled to the extension portion, wherein the first motor assembly and first actuator are configured to move the extension portion along an axis. A second motor assembly coupled to the end effector. The second motor assembly can be configured to rotate the end effector 360 degrees around an axis. The apparatus can include a control system to operate the apparatus.

14 Claims, 25 Drawing Sheets

MOTORIZED OVERBED TABLE FOR BEDS AND RECLINERS

REFERENCE TO RELATED APPLICATION

This U.S. Patent Applications claims priority to U.S. Provisional Application No. 62/675,963 filed May 24, 2018, the disclosure of which is considered part of the disclosure of this application and is hereby incorporated by reference in its entirety.

FIELD OF THE INVENTION

This invention relates generally to a motorized table for beds and recliners, and specifically to a table system with a plurality of degrees of freedom controlled electronically.

BACKGROUND

Individuals with severe disabilities often require significant assistance from caregivers, friends, and family to deploy, position, store, and charge mobile devices from bed. Existing bed tables were not designed to assist persons with upper extremity mobility impairments (UEMIs) to be more independent and productive even while in bed. These individuals do not have readily accessible and fully independent access to mobile devices, which significantly restricts their independence and limits their productivity. Individuals with UEMIs include those with arm or hand amputation, traumatic brain injuries (TBIs), spinal cord injuries (SCIS), cerebral palsy, stroke, amyotrophic lateral sclerosis (ALS), muscular dystrophy, multiple sclerosis, spinal muscular atrophy, spina bifida, Parkinson's, rheumatoid arthritis, and other conditions. One of the largest groups of individuals with UEMIs are the approximately 500,000 power wheelchair users in the US (IBIS World, 2016). Individuals with UEMIs often stay in bed for a good portion of the day. Bed rest is frequently critical for this target group due to the need to prevent or recover from pressure sores and is susceptible to secondary medical complications and comorbidities, such as respiratory infections, cardiovascular diseases, deep vein thrombosis, and diabetes (National Spinal Cord Injury Statistics Center (NSCISC), 2011; Paralyzed Veterans of America, 2001). Remaining in bed also frequently occurs when performing nursing care or when wheelchairs breakdown.

UEMIs commonly prevent individuals from retrieving, positioning, and using a mobile device, portable computer, book, cup, or other personal use items by themselves while in bed, even with motorized medical bed functions and the best bed tables. Once they are finished using the personal item, they need to be able to remove it. These individuals are typically dependent upon caregivers, family, and others in placing and removing these items. When the person in bed wants to switch between using different objects, such as a phone, a tablet, or a cup, they must continually request help from others, which can happen frequently if they are in their bed a good portion of the day.

Products such as overbed tables (OBTs) (Hill-Rom, Stryker), on the bed tables (Laptop Laidback), lap desks that rest directly on the users' laps, and manual articulating arms (GCX®, Ergotron®), such as those illustrated in U.S. Pat. Nos. 9,788,647, 5,775,234, and 6,615,744 are widely commercially available. However, these products do not provide the features and capabilities to enable individuals with upper extremity mobility impairments (UEMIs) to access them when needed and independently use typical mobile devices. Moreover, these products are marketed as convenience items rather than medically necessary to allow persons with UEMIs to be more productive and employed, socially connected, and assist during potential emergency situations. In the medical and nursing home industry, overbed tables are known as simple mechanically operated structures for raising and lowering a table member on a single vertical axis. These types of mechanical OBTs may have a simple table positioned on a generally vertical column that is attached to a base support that may have beam members with casters or wheels at corners.

It is very difficult for someone with no or limited strength, dexterity, or range of motion in their hands and arms to adjust the height or angle of the surface of existing OBTs. Rolling it out of the way can also be very challenging, especially on carpet or if there are obstacles on the floor. Moreover, once the OBT is pushed out of the way it is even more difficult to reach it to retrieve later. These current OBTs fail to provide the necessary adjustability and multiple degrees of freedom needed for individuals with disabilities, including those with UEMIs, who are confined to a bed for long periods of time and need to be more independent, productive, socially connected, entertained, and able to access emergency communication. Furthermore, individuals with weak or easily tired upper extremities due to dialysis, chemotherapy, and IV therapy as well as able-bodied individuals that want to enhance their productivity and entertainment options from a bed or recliner could benefit from design improvements to current vertically adjustable tables.

There exists a need for a robotic overbed table for bedside use that enables the user to independently deploy, position, and store a table surface for mobile phones, tablets, laptops, remote controls, and other personal items, such as food and drink.

BRIEF SUMMARY OF THE INVENTION

In one aspect, this disclosure is related to an overbed table (OBT) apparatus. The OBT can include a first arm having an extension portion configured to move along a first axis. An end effector can be coupled to the extension portion and include has a first end and a second end. The end effector can be generally perpendicularly oriented with respect to the orientation of the first arm. A first motor assembly can be configured to actuate a first actuator that can be coupled to a first end of the first arm. The second end of the first actuator can be coupled to the extension portion. The first motor assembly and first actuator can be configured to move the extension portion along a first axis. A second motor assembly can be configured to rotate the end effector 360 degrees around a second axis. The OBT can include a control system that is communicatively coupled to the first motor assembly and the second motor. The OBT can further include a sensor system communicatively coupled to the control system. The sensor system can include a first IR break beam sensor on the first end of the end effector and a first IR reflector positioned on the second end of the end effector directly across from the IR break beam sensor, wherein the IR break beam sensor is communicatively coupled to the control system and configured to prevent or stop the movement of the end effector when the beam is not reflected back to the IR break beam sensor. Additionally, the OBT can include a moveable mobility base. The mobility base can be motorized and/or include a linear actuation system to provide additional directional controls and range or motion of the OBT. The mobility base can have a plurality of wheels that can include a motor to move the wheels.

In another aspect, this disclosure is related to an OBT including a first arm and a second arm hingedly coupled to the first arm. The second arm can include an extension portion configured to move along a first axis. An end effector can be coupled to the extension portion, oriented generally perpendicular oriented from the second arm. A first motor assembly can be to actuate a first actuator. The first end of the first actuator can be coupled to the first arm and the second end of the first actuator can be coupled to the second arm. The first motor assembly and first actuator can be configured to move the second arm along an axis. A second motor assembly can be to actuate a second actuator. The first end of the second actuator can be coupled to a first end of the second arm and the second end of the second actuator can be coupled to the extension portion, wherein the second motor assembly and second actuator are configured to move the extension portion along an axis. A third motor assembly can be configured to rotate the end effector along an axis. A control system can be communicatively couple to the individual motors to control the movement of the OBT.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE INVENTION

Figure 1A:
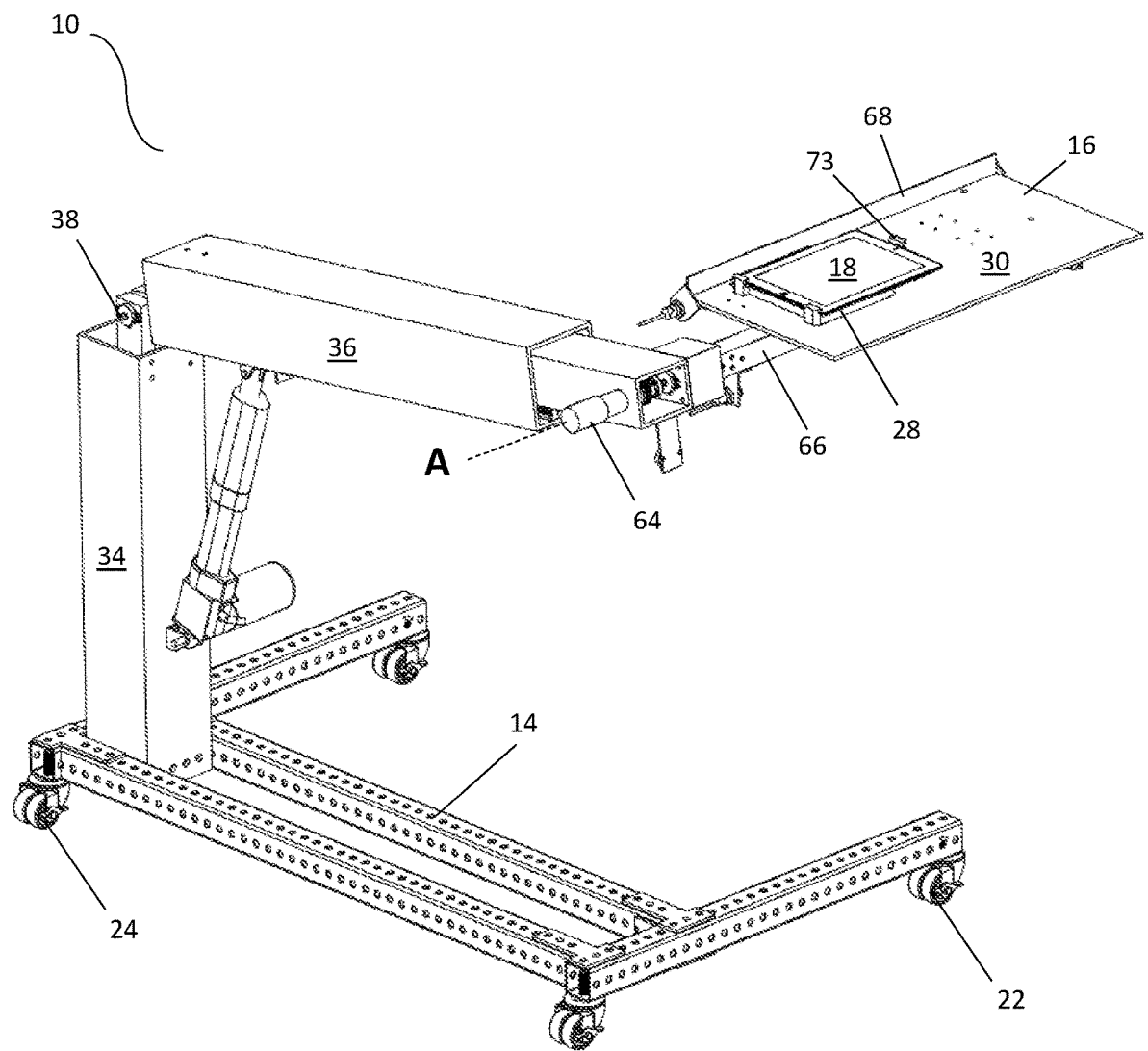
FIG. 1A is a perspective view of an exemplary embodiment of the overbed table apparatus of the present disclosure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The present disclosure relates generally to a motorized OBT 10 for use over a bed 20, which may be used to automatically deploy and retract away from a user in the bed using one or more articulating arms. The motorized OBT 10 apparatus of the present disclosure is configured to couple to either a structure, such as a wall 12 or a mobility 14 base that can be used to move the OBT=10 in and out of position or in and out of a desired room. An exemplary embodiment of a motorized OBT apparatus 10 can be configured to enable a user to independently control and position an end effector or desk portion 16 over a person in a seated, reclined, or supine position. The desk portion 16 can allow the user to comfortably eat, read, write, or operate a computing device 18. The table of the present invention can provide individuals with UEMIs independent access to much-needed commercial devices while in bed or other recliners and is further designed to achieve one or more of the following goals: (1) be independently deployable and retractable by a user with UEMIs, (2) eliminate the need for a table to physically rest on or contact the user, (3) provide easy access to the user in bed by caregivers and allow easy ability to move or position the user, (4) securely hold objects and devices and limit movement to prevent the devices from falling off the surface of the table portion 16 when the table is moved, (5) enable a user to make fine positional adjustments to enhance device usability for typing, touchscreen access, writing, and adjust viewing angles, (6) be controlled by various accessible interfaces, such as voice control, accessible switches, and gesture control, and (6) continuously charge mobile devices and other devices via the OBT 10. It will be appreciated that, in some embodiments, the motorized OBT 10 may achieve some, but not all, of the foregoing goals. Furthermore, although the motorized OBT 10 is described herein as being coupled (or attachable) to a wall 12 or mobility base 14, it is contemplated that the motorized OBT may also be attached to other systems, including beds and other furniture, a static base, vertical post, and floors and ceilings.

The motorized OBT 10 is configured to operate according to a plurality of degrees of freedom. As illustrated in FIGS. 1-4, may include at least two degrees of freedom. In some exemplary embodiments, the motorized OBT can may have at least three actuated degrees of freedom to position the end effector 16 in three-dimensional space above a user. These three degrees of freedom can include vertical position, horizontal position, and surface rotation of the table portion 16.

Figure 3A:
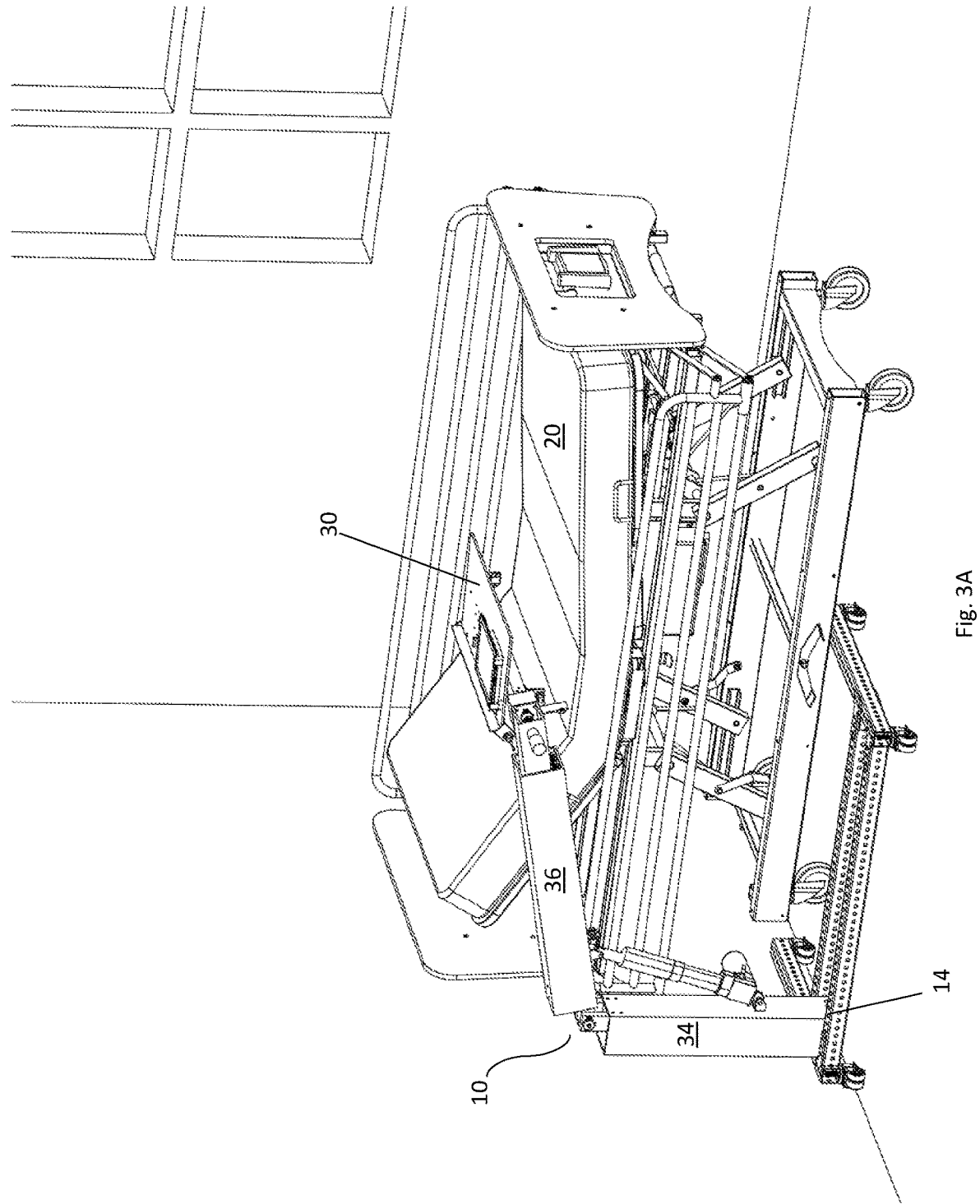
FIG. 3A is a perspective view of an exemplary embodiment of the overbed table apparatus of the present disclosure in a flat position.
Figure 3B:
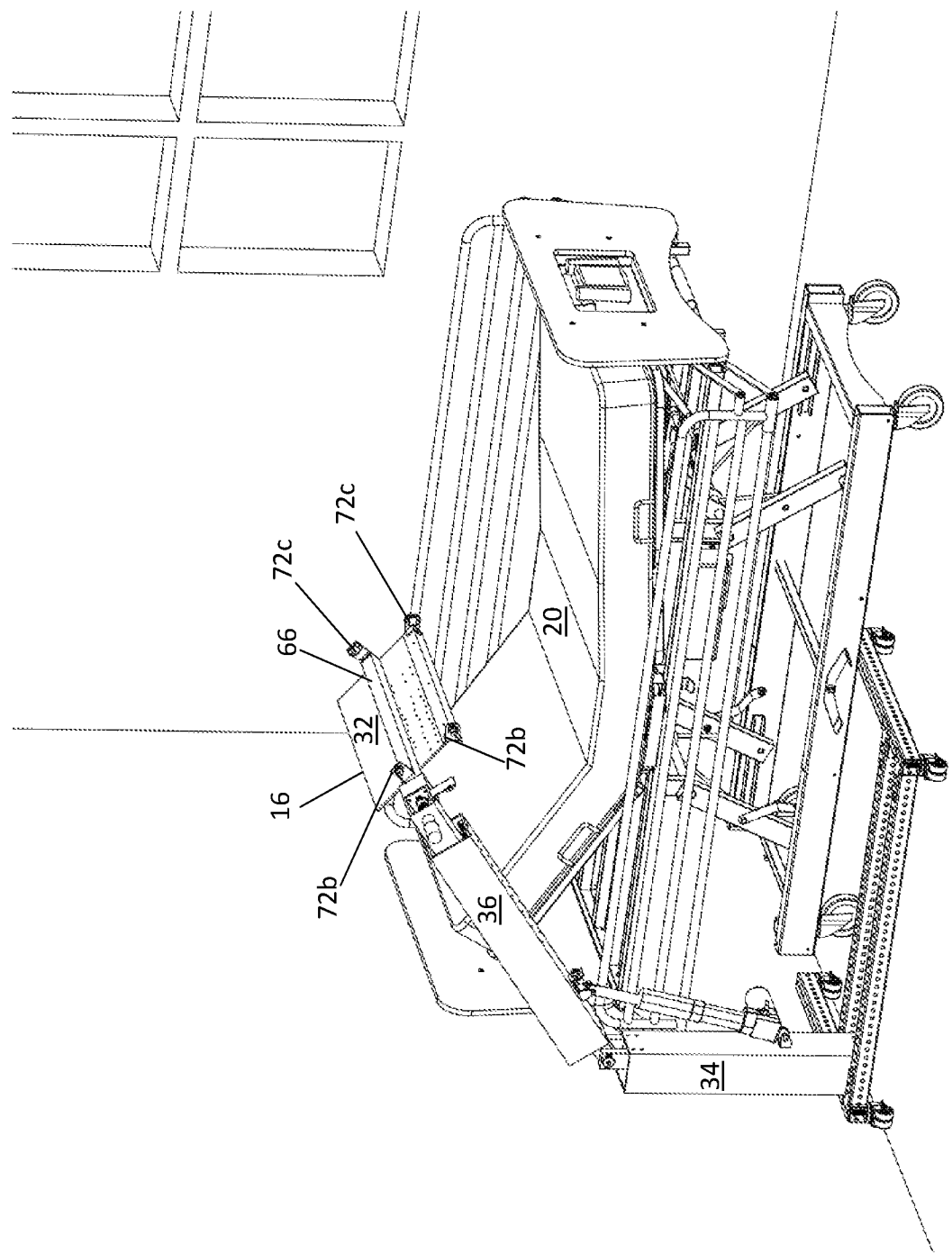
FIG. 3B is a perspective view of an exemplary embodiment of the overbed table apparatus of the present disclosure in a laying back position.
Figure 3C:
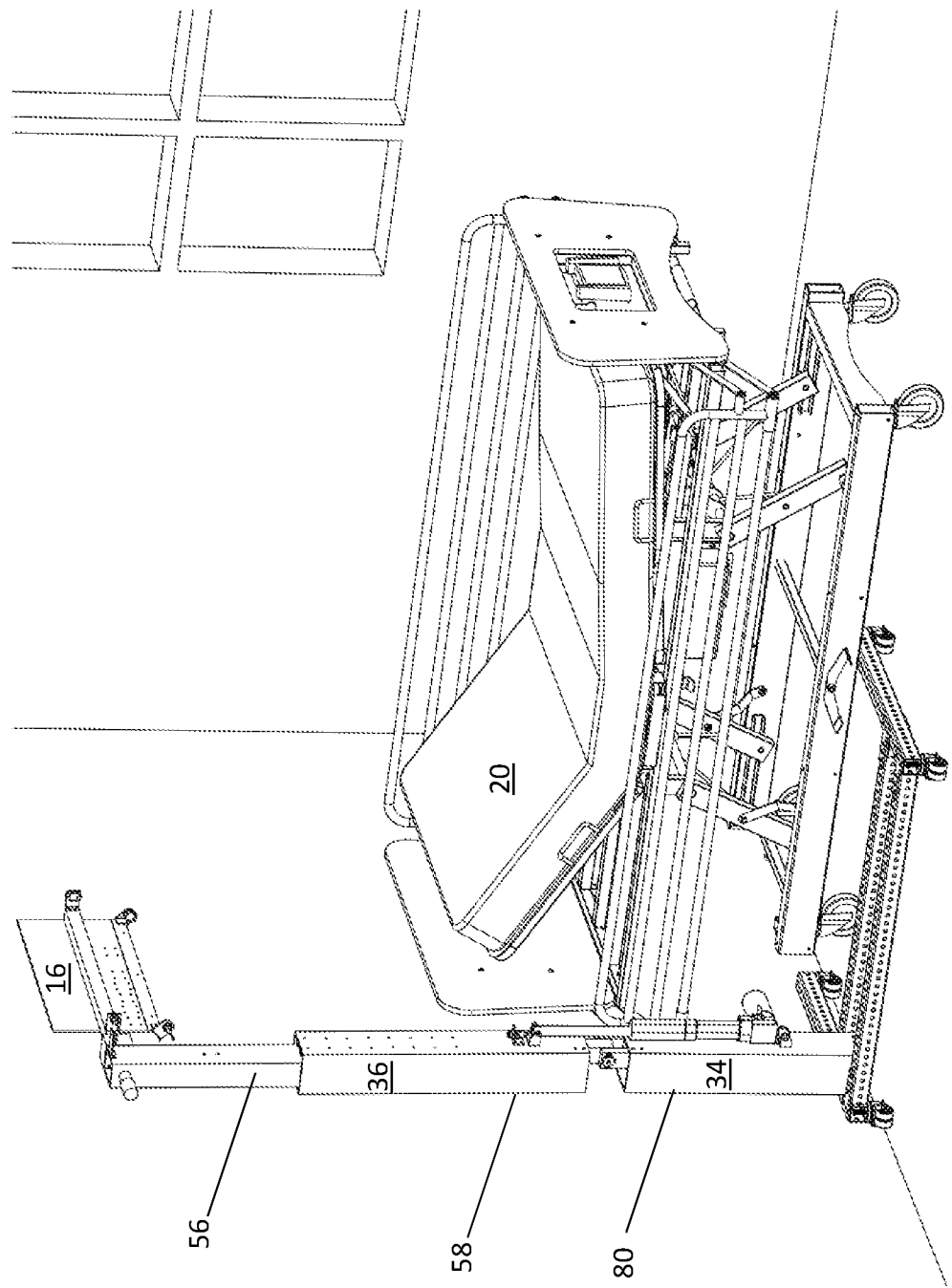
FIG. 3C is a perspective view of an exemplary embodiment of the overbed table apparatus of the present disclosure in a stored position.
Figure 4:
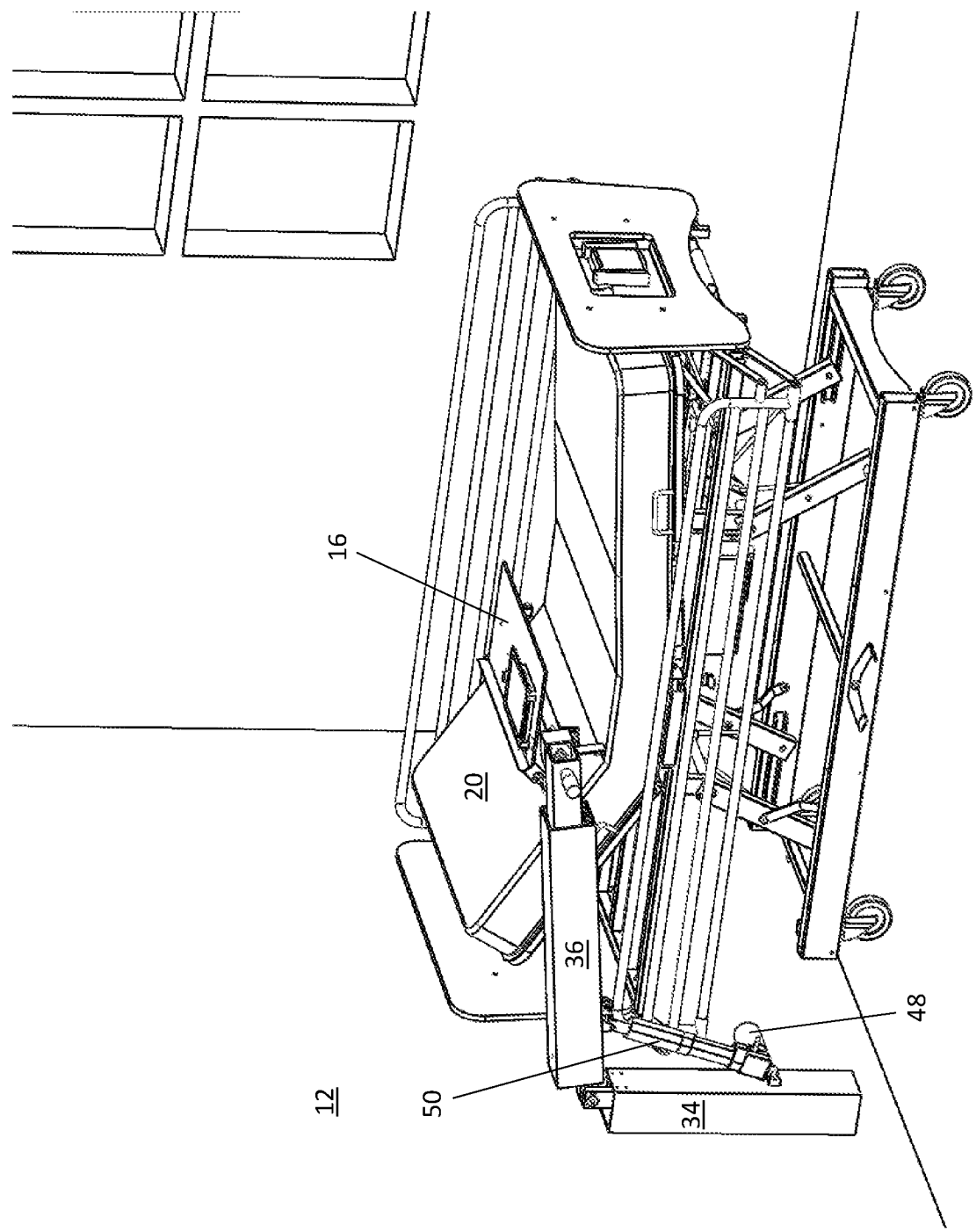
FIG. 4 is a perspective view of an exemplary embodiment of the overbed table apparatus of the present disclosure, wherein the apparatus is coupled to a wall.

A motorized OBT 10 of the present disclosure can be stored against the wall 12, at or above the head of the bed, and at or below the foot of the bed to minimize or completely eliminate any potential impedance to the caregiver of the user. One exemplary OBT of the present disclosure can be mounted or coupled to a mobility base 14, such as a locking wheel base as illustrated in FIGS. 1-3, or alternatively can be directly mounted to a structure 12, such as a piece of furniture, vertical floor-to ceiling post, or wall, as shown in FIG. 4. The mobility base can have one or more rolling features or wheels 22 to allow a user to easily move the motorized OBT 10 throughout a room. The wheels 22 can include a locking feature 24 to allow a use to lock the mobility base 14 in place to prevent further movement.

The motorized OBT 10 can store against a wall 12 at the head of a bed 20 so it does not impede the access of a user or caregivers. The OBT 10 can be mounted onto a locking wheelbase 14 (FIGS. 1-3), wall bracket 26 (FIG. 4), floor frame, or vertical floor-to-ceiling post. A user can provide commands for the OBT 10 to deploy. The commands can be provided by various methods and systems, such as a remote control, accessible switch, or voice or gesture control. The commands can safely move the effector end 16 to a desired position. In some exemplary embodiments the desired end position can be a programmable preset first location to deploy a customized table surface 30 in front of the user above the bed 20 as shown in FIG. 3A. The table portion can include a top surface 30 and a bottom surface 32. The top surface 30 can include a mounting system 28 for phones, tablets, laptops, and remote controls, a surface 30 for eating, drinking, reading, and writing, a gravity-stabilized drink holder, standard USB and power outlets, and other optional accessories, such as a reading light, mirror, remote control, or attendant call button. The table surface 30 can be easily and precisely positioned using the motorized height, horizontal position, and tilt angle controls by the user based on their needs without physical effort. Similarly, the bottom surface can also be used for other or similar purposes and can be designed in a similar way as the top surface.

The mechanism will move safely by mechanically and electrically limiting the maximum transmission force and using one or more sensors to detect contact with the environment so it will not be able to cause damage to the user, bystanders, or nearby equipment. In one exemplary embodiment, a torque limiter 78 or mechanical slip clutch can be coupled to the motor to limit the amount of force applied by the motor. Additionally, FIG. 2D illustrates a detailed view of the motor assembly for the table support arm 66. The motor 64 can rotate the table support arm 360° around an axis, such as axis A shown in FIG. 1A. A shaft coupler 75 can couple the support arm 66 to the drive shaft 77. The shaft couple can include one ore more ball bearings to aid in supporting the rotation of the shaft 77 and table portion 16. The drive shaft can freely rotate within one or more bearing units 79. The bearings can be any suitable type of roller bearing, such as ball bearings, roller bearings or bushings instead. The shaft 77 can be coupled to motor 64 via the mechanical slip clutch torque limiter 78. The torque limiter is able to save space, however, other shaft couplers could work. In some exemplary embodiments, the motor can use a rotary encoder 81 at the output after the torque limiter 78 since the torque limiter can decouple the motor from the output. Alternatively, if a torque limiter is not included, a motor with a built-in rotary encoder can be used.

Figure 1B:
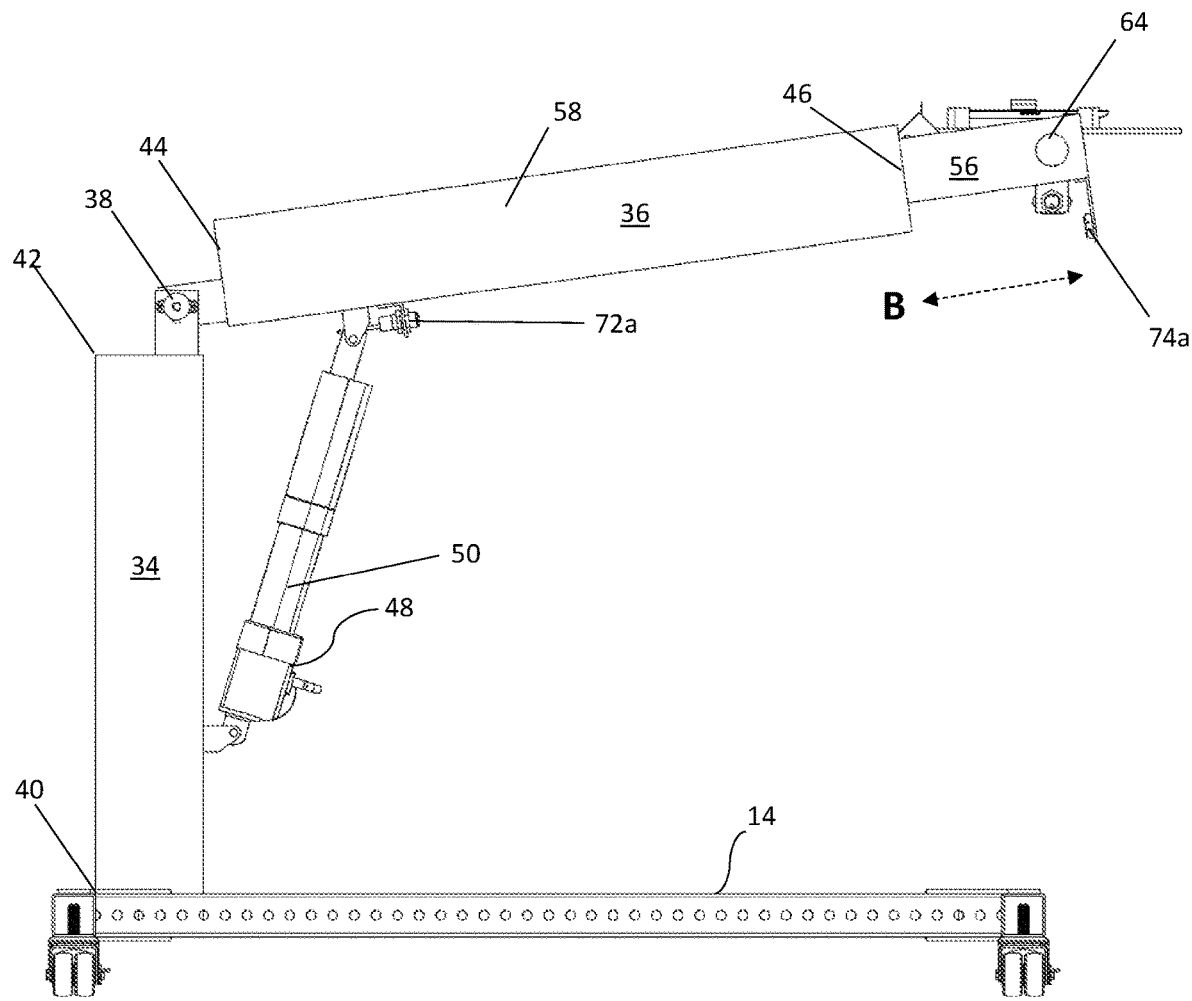
FIG. 1B is a side view of an exemplary embodiment of the overbed table apparatus of the present disclosure.
Figure 1C:
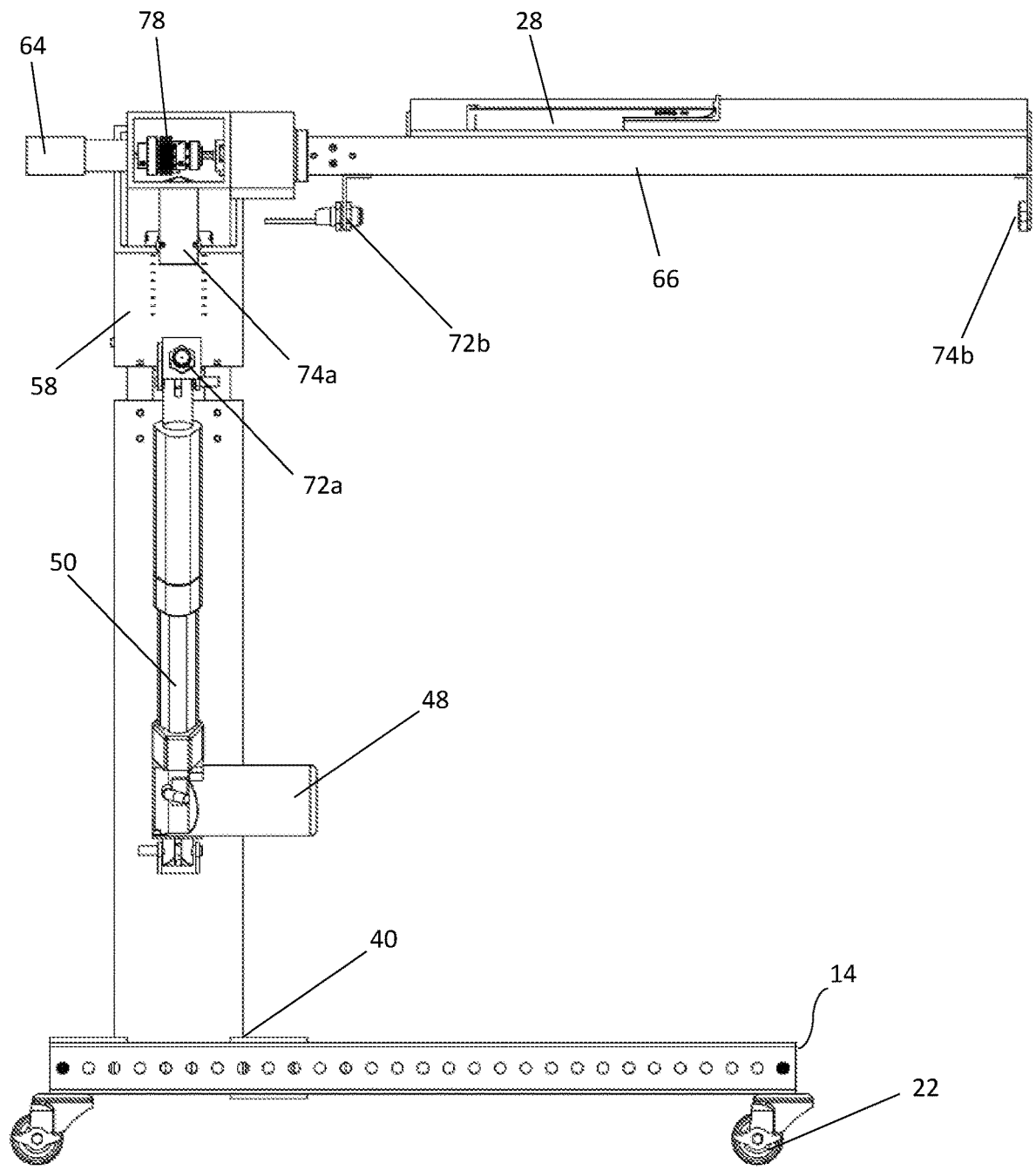
FIG. 1C is a front view of an exemplary embodiment of the overbed table apparatus of the present disclosure.
Figure 2A:
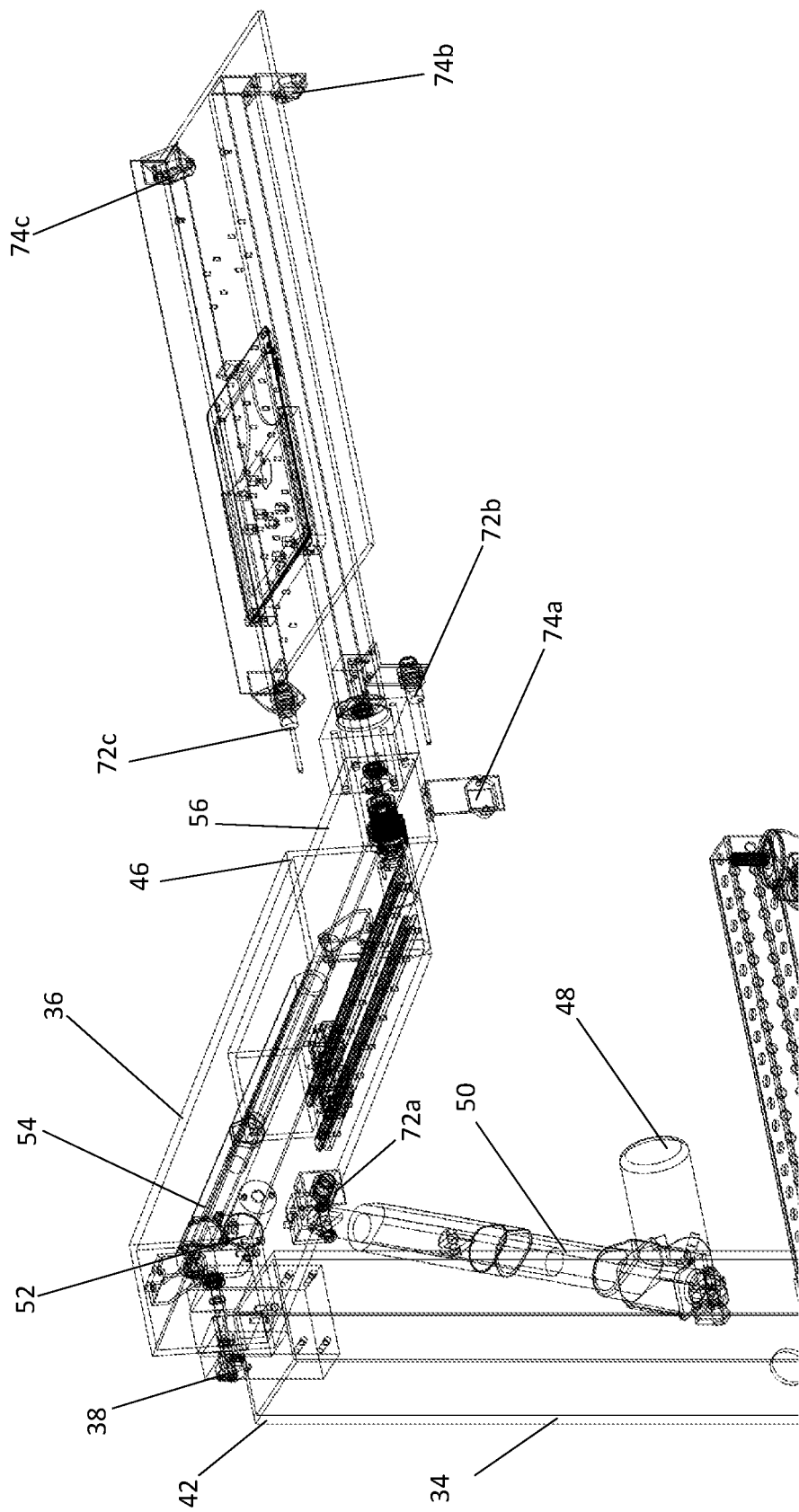
FIG. 2A is skeletonized internal view of an exemplary embodiment of the overbed table apparatus of the present disclosure.
Figure 2B:
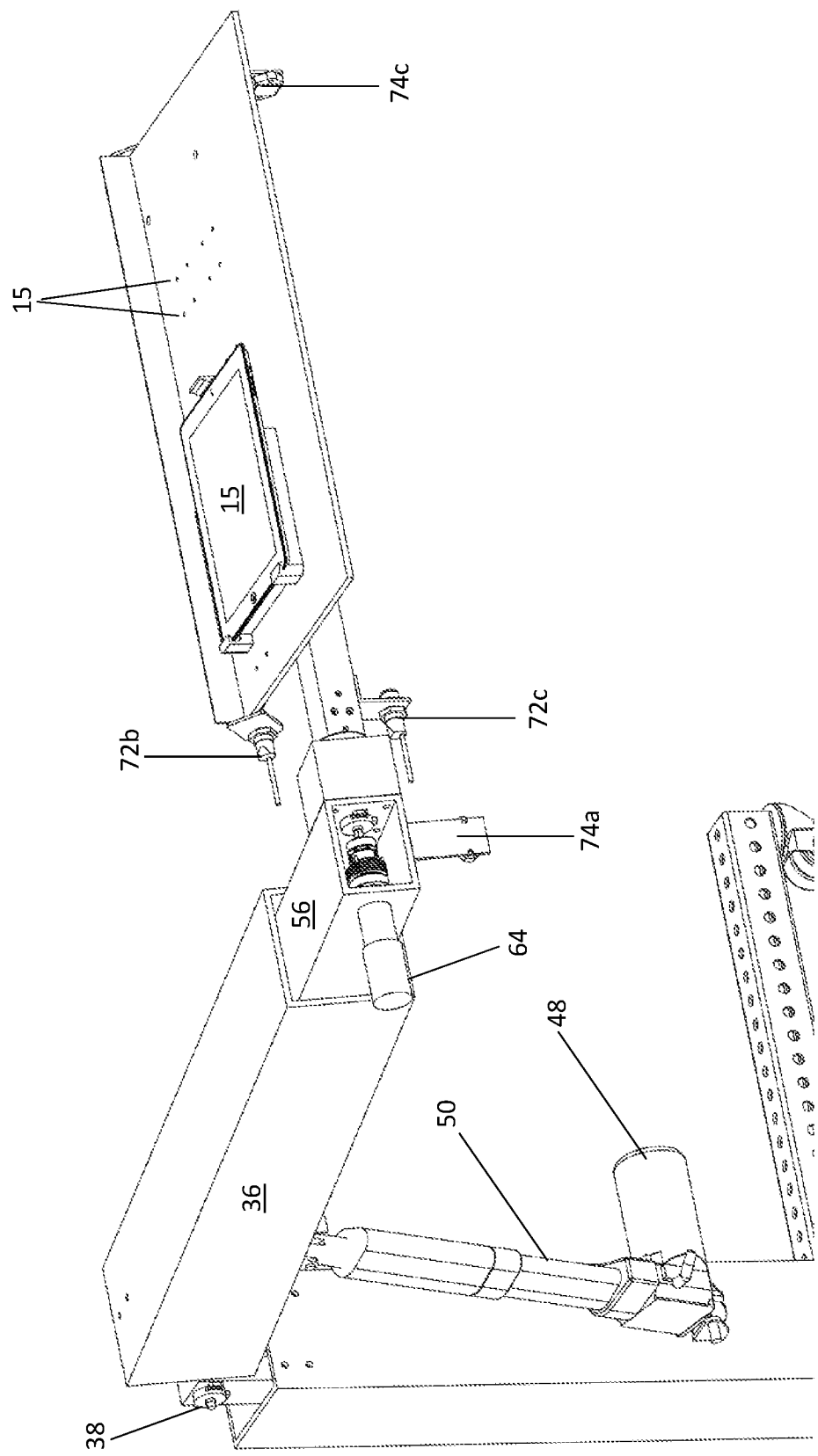
FIG. 2B is perspective view of an exemplary embodiment of the overbed table apparatus of the present disclosure.
Figure 2C:
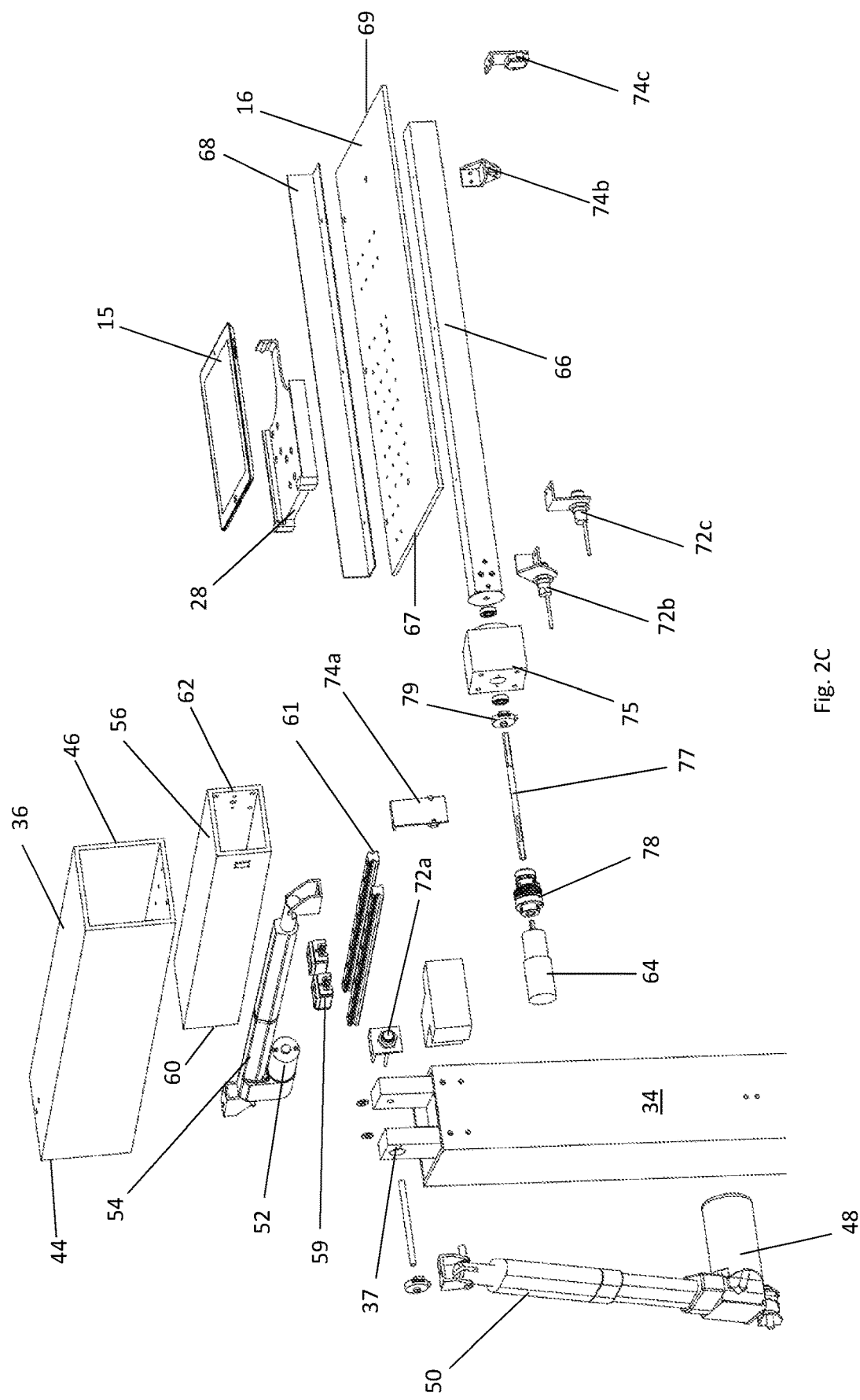
FIG. 2C is an exploded view of an exemplary embodiment of the overbed table apparatus of the present disclosure.
Figure 2D:
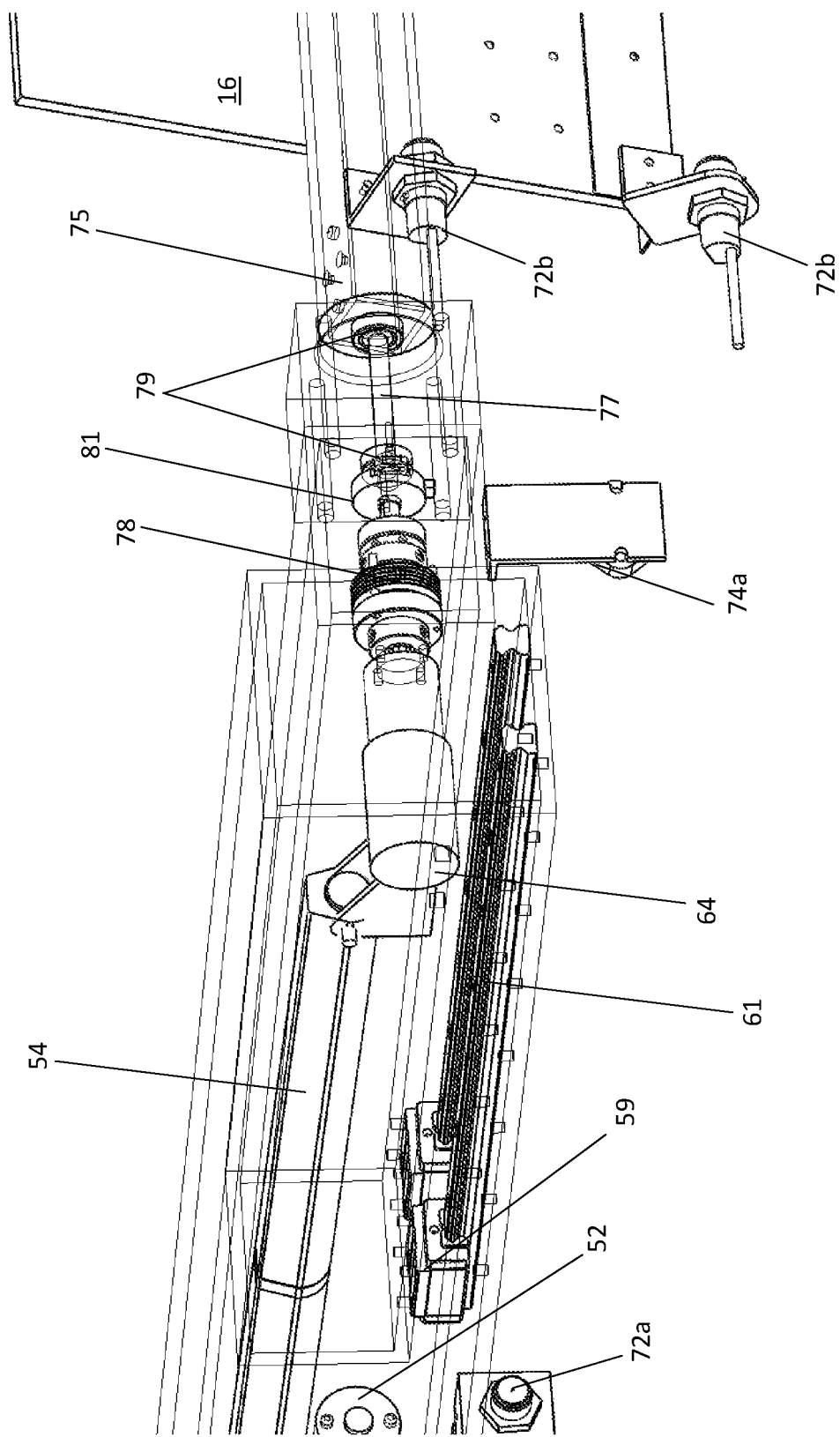
FIG. 2D is a is a detailed view of a motor assembly and rotational arm detail of an exemplary embodiment of the OBT of the present disclosure.

Similarly, a pressure sensor can be used to monitor force applied to an external object. Position sensors (e.g. potentiometer or similar linear or rotary encoder) can be used for each degree of freedom to control the systems 10 position and speed and prevent unintended operation. As shown in FIGS. 1B-C, 2, and 7, some exemplary embodiments of the OBT can use IR break beam sensors 72 along with IR reflectors 74 to help prevent portions of the OBT from coming into direct contact with a user. The sensors 103 can be placed in various locations with respect to various elements. In some exemplary embodiments, the sensors can be placed on opposite end of the underside of the table portion 16, as shown in FIGS. 2A-2C. On a first end 67 an IR break beam sensor 72b can be located under the bottom surface of the table portion 16. A corresponding IR reflector 74b can be located directly across from the beam sensor 72b on the opposite second end 69 of the table portion. In some embodiments, multiple sensors can be used such as a second set of IR break beam sensors 72c and reflectors 74c can be placed on opposite sides of the table portion. As shown in FIG. 3B, one embodiment can have corresponding sensors that are located on each side of the support arm 66, while another set of sensor components can be located along the bottom edge 31 of the table portion. One of ordinary skill in the art would understand that any suitable sensor could be used to detect when the table portion 16 is into too close of contact with the user or to maintain a pre-determined distance from the user. Other exemplary embodiments could use proximity sensor to determine the distance between the sensor and a user to ensure that the table portion does not come in direct contact with a user. Additionally, another sensor 103 can be positioned on the end of the extension portion 56 and used to prevent the table portion 16 of the OBT 10 from directly contacting a user when the extension portion 56 is moved from a first position to a second position. In some exemplary embodiments, the sensor 103 can include an IR break beam sensor 72a and an IR reflector 74b shown in FIG. 2A.

A user can easily program pre-set positions for rapid automatic positioning, such as automatically positioning the device from the folded position (FIG. 3C) to a flat position (FIG. 3A). The sensors can detect proximity or contact with the user, bystanders, or other proximate elements in the surrounding environment to prevent or minimize unintentional contact. In one exemplary embodiment, the motorized OBT can be positioned over the user's head so they can watch a mobile device 18 or read while laying down (FIG. 3B). This can be set as a second programmable preset second location for a user. The OBT 10 can be commanded to be in a third programmable preset location, wherein the location is stored back completely against the wall and out of the way from impeding access above the bed surface, as shown in FIG. 3C.

One exemplary embodiment of the motorized OBT 10 of the present disclosure can include an articulating arm assembly that may include a first arm 34 and a second arm 36, wherein the first arm 34 is hingedly connected to the second arm 36 and a hinge point 37. The OBT 10 can also include an electrical assembly 70 that can include limit switches. Similarly, the electrical assembly 70 can comprise a microcontroller 101 and one or more safety sensor system 102 including one or more sensors 103, such as proximity and/or contact sensors, to control various elements of the OBT system. The first arm 34 and second arm 36 can be hingedly connected using a hinge 38. The hinge 38 can be coupled to the second end 42 of the first arm 34 and the first end 44 of the second arm 36. The arm assembly can include one or more motors to move various components, such as the first arm 34, the second arm 36, and the table portion 16.

Figure 5A:
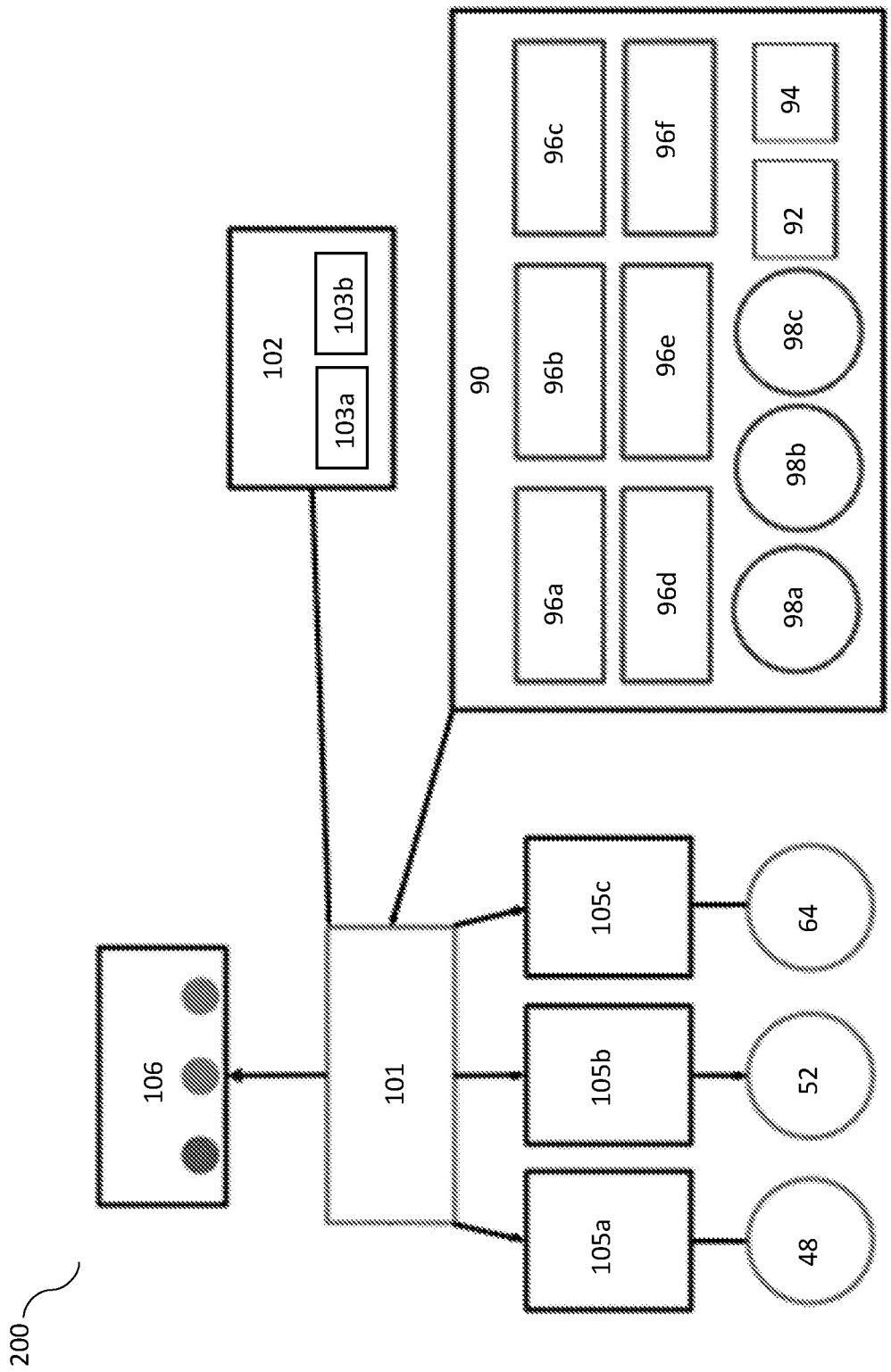
FIG. 5A is a schematic electrical diagram of a control system of the motorized OBT of the present disclosure.
Figure 5B:
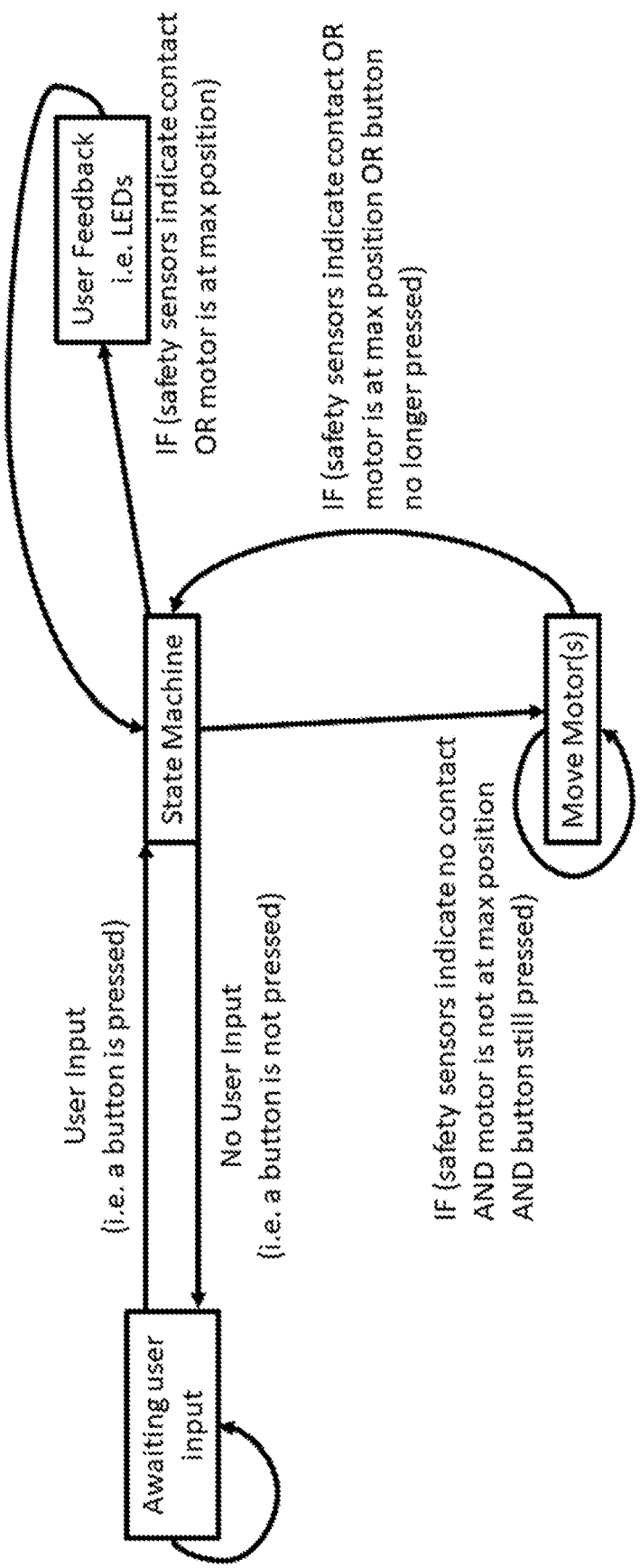
FIG. 5B is a logic diagram of the control system of an exemplary embodiment of the OBT of the present disclosure

An electrical assembly 70 can comprise various means to drive and control the motor assemblies 48, 52, and 64. Some embodiments can use relays and limit switches coupled to the motor assemblies. Alternative embodiments can use microcontroller(s) 101, sensor(s) 103, motor driver(s) 105, and motors assemblies (48, 52, 64) to control the various elements and functions of the OBT 10. The system can further communicate and/or be electrically coupled to a user input controller 90. FIGS. 5A-5C illustrate an exemplary embodiment of a circuit diagram(s) and feedback loops or the electrical assembly 70 of an exemplary embodiment of the OBT 10 apparatus of the present disclosure.

A person having ordinary skill in the art will recognize that the circuit diagram may change depending on the various embodiments of the motorized mount and the coupled seating system. In one embodiment can include a control system 200 which can include a microcontroller 101 communicatively coupled to one or more sensors 103, a first motor driver 105a, a first motor assembly 48 and, a second motor driver 105b, and a second motor assembly 52. In other embodiments, the microcontroller can be coupled to a third motor drive 105c and a third motor 64. The system can further incorporate user feedback system 106. The user feedback system 106 can also include on or more indicators to signal when a motor is at a terminal position or if a sensor 103 has been tripped. The indicators can include a visual and/or audio indicator such as a light or sound to provide a feedback to the user when operating the system. The control system can also include preset buttons (98a-c) that correspond to pre-determined positions of the table portion 16, such as a stored position, reclined position, or a supine position. Similarly, on or more control buttons (96a-f) can control various aspects of the OBT 10, such as the extension or retraction of the extension portion 56, the rotation of the table portion 16, the movement of the motorized wheels of the mobility base, or the movement of the second arm 36 along the linear axis or vertical axis when using the hinged embodiment.

In some exemplary embodiments, such as those shown in FIGS. 2A-2C, an absolute rotary encoder (through shaft potentiometer) or incremental encoder for motors 48 and 52 can be used. Motor 64 can have a built-in potentiometer or other rotary encoder for position feedback. Additionally, one or more of the motors could be swapped for a linear actuator that has built-in position feedback or any other suitable driving means.

FIGS. 5A-B illustrates the microcontroller and motor driver(s) that allow the first and second motors, to run in both forward and reverse directions, which in turn can extend or retract the respective actuators. An input switch or motor driver may be communicatively coupled to a third motor assembly, and a motor driver, or limit switches and relays can allow for the motor to drive one or more gear/motor assemblies to turn the table support arm 66 rotationally 360 degrees along an axis. The third motor assembly can turn the table support arm along an axis about 360 degrees, or about 270 degrees, or about 180 degrees. In one exemplary embodiment, the table portion 16 can be coupled proximate to the end of the table support arm 66. Similarly, the table support arm 66 can extend the entire length of the table portion to provide additional support. In yet another exemplary embodiment, the table portion 16 can have an integrated support arm that can be directly coupled to the third motor assembly 64.

A first motor assembly 48 can be used to drive a first actuator 50 to move the second arm along a vertical axis. A first end 76 of the first actuator 50 can be coupled to a portion of the first arm 34. In some exemplary embodiments, the first end 76 can be coupled proximate to the first end 40 of the first arm 34. Similarly, the first arm 34 can have an interior portion that can be configured as a first arm housing 80 to maintain the first actuator 50 within the housing. The first arm housing can have a plurality of side walls, such as three side walls 82 to form the housing 80. In one exemplary embodiment, the first actuator 50 and first motor assembly 48 can be at least partially housed within the housing 80. In the aforementioned exemplary embodiment, when the actuator can be extended to it outer most position and in a vertical position and perpendicular to the floor, as illustrated in FIG. 3C. In some embodiments, the actuator 50 can be located external from the housing, internal within the housing or partially within the housing 80. The first arm 34 can be coupled to a bracket or mobility base 14. In one exemplary embodiment, the first end 40 can be coupled to the mobility base 14. Other embodiments could potentially use relays and switches with a PLC-type controller to control the OBT system.

A second motor assembly 52 can be used to drive a second actuator 54 to move an extension portion 56 of the second arm 36. The extension portion 56 can be housed within the second arm housing 58. The extension portion 56 can have first end 60 and a second end 62. The second actuator 54 can be coupled to the second arm 36 and the extension portion 56. When the second actuator 54 is activated using the second motor assembly 52 the extension portion 56 can be fully or partially housed within the second arm housing 58. When activated by the second motors assembly 52, at least a portion of the extension portion 56 can be extended out from the housing portion 58 directionally out from the second arm 36 along an axis B as shown in FIG. 1B. The actuators of the present invention can use a stiff linear guide rail support to extend and retract the various elements of the OBT 10. Additionally, the extension portion 56 be configured to allow a user to couple a number of accessories, such as shelving space, storage bags, a flat table portion, a mirror, cup holder. The housing portion 58 can include one or more guides 59, such as a pillow block linear ball bearing guide. The guides 59 and rails 61 can increase stiffness. In some exemplary embodiments, the guide rail can have a rectangular profile which can better support the load and resist the mount arm of the table because of the rail geometry.

The housing can include one or more rails, such as a profile linear rail 61. The guides and/or rails 61 can help reduce friction and better guide the extension portion 56 as it is being moved from a first position to a second position. In some exemplary embodiments, the guides 59 and rails are coupled to one or more interior walls of the housing 58 of the second arm 36 as shown in FIGS. 2C-D. In some exemplary embodiments, the extension portion 56 can have a housing 57 or configured in a manner where the extension portion 56 has an interior are that can house a portion of the actuator 54. The rails 61 and bearing guide 59 can be similar in nature to those illustrated in FIG. 6C that are used for the linear rail system 100.

A table support arm 66 can be coupled proximate to the second end 46 of the second arm 46. The table support arm 66 can extend at a generally perpendicular orientation with respect to the configuration of the second arm 36, as shown in FIG. 1A. In some exemplary embodiments, the table support arm can extend over the bed 20. Coupled to the table support arm can be the end effector or table portion 16. The table portion 16 can include a mounting system 28. Similarly, one or more edges of the table portion 16 can include a lip 68.

The mounting system 28 can be any suitable device to couple a mobile device/computer to the table portion 16, such as magnetic mount system, loop and hook fasteners, elastic cords, or a device bracket. In one exemplary embodiment, the mounting system can have one or more attachment members 73 to hold and maintain the computing device 18, book, or other material. The one or more attachment members 73 can be located on an adjustable bracket that can be moveable to accommodate various sized of devices. Apertures 15 in the table portion 16 can provide adjustable positioning for the attachment members 73. The computing device 18 may be coupled to the table portion 16 in a number of ways (which helps to accommodate a variety of different types of computing devices 18). In some embodiments, the table portion 16 can be composed of plastic, metal, metal alloy, or the like and may be secured (via a number of fasteners) to the table support arm 66. Similarly, the table portion 16 and table support arm 66 can be jointly formed as a single member. In another exemplary embodiment, the computing device can be directly coupled to the table support arm 66. The computing device 16 may then be removably coupled to the table portion 16 via VELCRO, magnets, suction, snaps, adhesive, or other suitable mechanisms. In other embodiments, a case of the computing device 16 may be directly coupled.

In some exemplary embodiments, when the actuator is fully extended, the linkages of the arms will allow the OBT 10 to fold against the wall so as not to take up room when not needed, as shown in FIG. 3C. The top surface 30 of the motorized OBT 10 of the present disclosure can hold several different items. One side of the end effector surface 30 can serve as a mount for one or more mobile device, such as a tablet and mobile phone 18. These mounts 28 secure the devices in place even when the surface is rotated upside down. The bottom surface 84 side of the OBT table surface could be used for placing more temporary use items such as for eating, reading, or performing healthcare procedures. Further, drinks will be stabilized on the side of the table surface with a bearing and gravity so they will maintain an upright position and not spill. Standard USB and other power connectors can be integrated into the motorized OBT 10 of the present disclosure, along with other optional accessories, such as a reading light, mirror, remote controls, assistant call button, or motorized bed controls.

While one illustrative embodiment of the motorized OBT 10 has been described above with reference to FIGS. 1-4, it is contemplated that other embodiments of the motorized OBT 10 may have additional or different features. For instance, while several portions of the articulating arm assembly are described above as having manual hinges or bearings, it would also be possible to add additional motors to move the portions automatically or different means for moving the second arm and extension portions of the second arm. This would likely add more weight to the motorized OBT 10 but may be desirable for individuals who cannot manually move portions of the articulating arm portions. The mechanics of the motorized mount 10 (e.g., the motors) might also be made more rugged by using higher gear ratio motors and stronger materials. This upgrade may be desirable for carrying larger computing devices 18 (e.g. laptop computers) and other equipment heavier than approximately five pounds. Where an alternative input device (e.g. a sip and puff, a touch switch, a magnetic switch, electromyography, etc.) is used in place of the input switch(es) of the controller 90, the motorized OBT 10 may include an electronic controller for interpreting signals from the alternative input device. This controller might process other signals related to the bed over which it is positioned or other devices which it is proximate to (e.g., heart rate/oxygen monitor, television, etc.). It is contemplated that the motorized OBT 10 may be powered by either the batteries or an external power source, including, but not limited to, separate batteries, solar power, electrical outlet, or kinetic power.

The controller 90 of an exemplary embodiment of the motorized OBT 10 can have a memory 92 and microprocessor 94, where the memory can store one or more pre-set configurations. The configurations can be manually altered or set depending upon the desired positions by a user. Similarly, at least three pre-set positions 98 can be set including a first position 98a wherein the surface 30 of the table portion 16 is angled down facing a user in a bed that is in a completely supine position. A second pre-set position 98b can be a "stowed" position, wherein the table portion lies parallel to and proximate to the wall to remain out of the way from any medical personnel or staff attending to the user or if the user does not desire to use the OBT 10. A third pre-set position 98c can include a traditional position wherein the table surface 30 is facing upwards and the user is in a reclined but not fully supine position. Additionally, the one or more sensors can be used to optimize the position of the table portion relative to the user's position in the bed or recliner 20.

In another exemplary embodiment illustrated in FIGS. 6A-6E, the second arm can be directly coupled to a linear rail system 100 located on the ground. The rail system 100 can have a rail or channel 102 and can use a linear motor assembly to drive the OBT along a horizontal axis along the channel. A mounting plate 110 can be used to couple the second arm 36 to the linear rail. The second arm 36 can move along a horizontal axis along the floor and can be perpendicular in configuration to the floor. The extension portion 56 can move extended along a vertical axis to adjust to the appropriate height of the user and the bed. The linear rail can be clamped down or coupled directly to the floor 2 or bed 20. The table portion 16 can be rotatable around a 360-degree axis and can be stored at either the head or foot of the bed. The table will move along the linear rail with a belt and pulley powered by a servo motor or a motor and a linear actuation system (i.e. motor and lead screw).

Alternatively, the rail/channel 102 can use a bearing to allow a user to early move the OBT along the rail without need of a motor. The table 16 will move vertically with a linear actuator inside the telescoping arms, and the table will tilt/rotate with a standard motor. All degrees of freedom will be controlled by the user and each actuator will have position feedback capability for automatic motion. One or more sensors can be used and communicatively coupled to the control system 200 to prevent contact with the user, bystanders, or the environment. The table surface will have power plugs (USB and standard outlet) and will be plugged into the wall at either end of the rail, which results in simpler cable management. This embodiment shows a cantilever table mounted on one side of the bed, but the table surface could be extended to the other side of the table with the same leg mount setup on the other side of the bed. The OBT 10 shown in FIGS. 6A-6E can comprise essentially the same components as the embodiments shown in FIGS. 1A-C, however, the linear rail embodiment would not require the first arm, first actuator. The rail system may still require a first motor and first motor driver to move the second arm along the track in a single fixed axis.

Figure 6A:
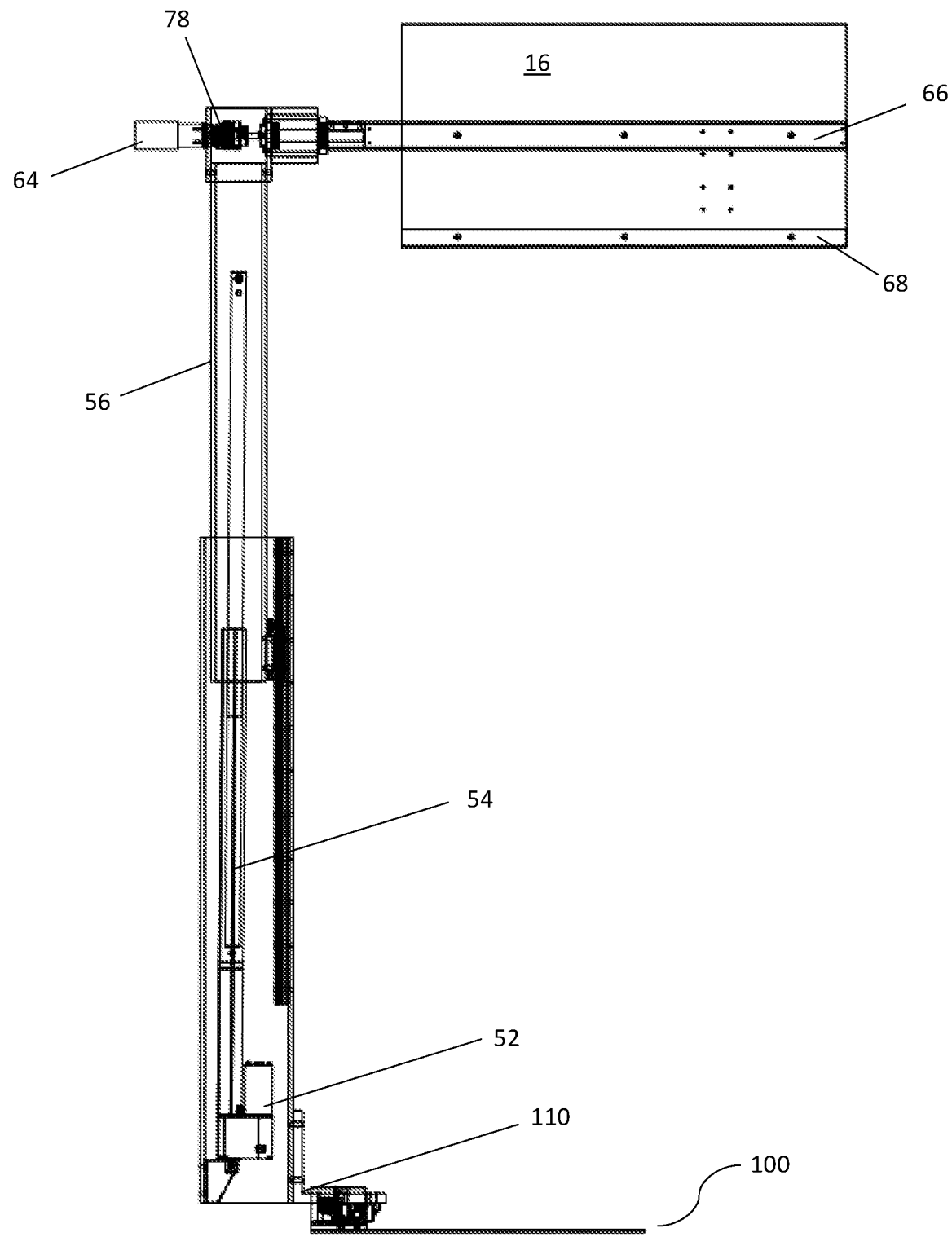
FIG. 6A is a front view of an exemplary embodiment of the overbed table apparatus of the present disclosure including a linear actuation system.
Figure 6B:
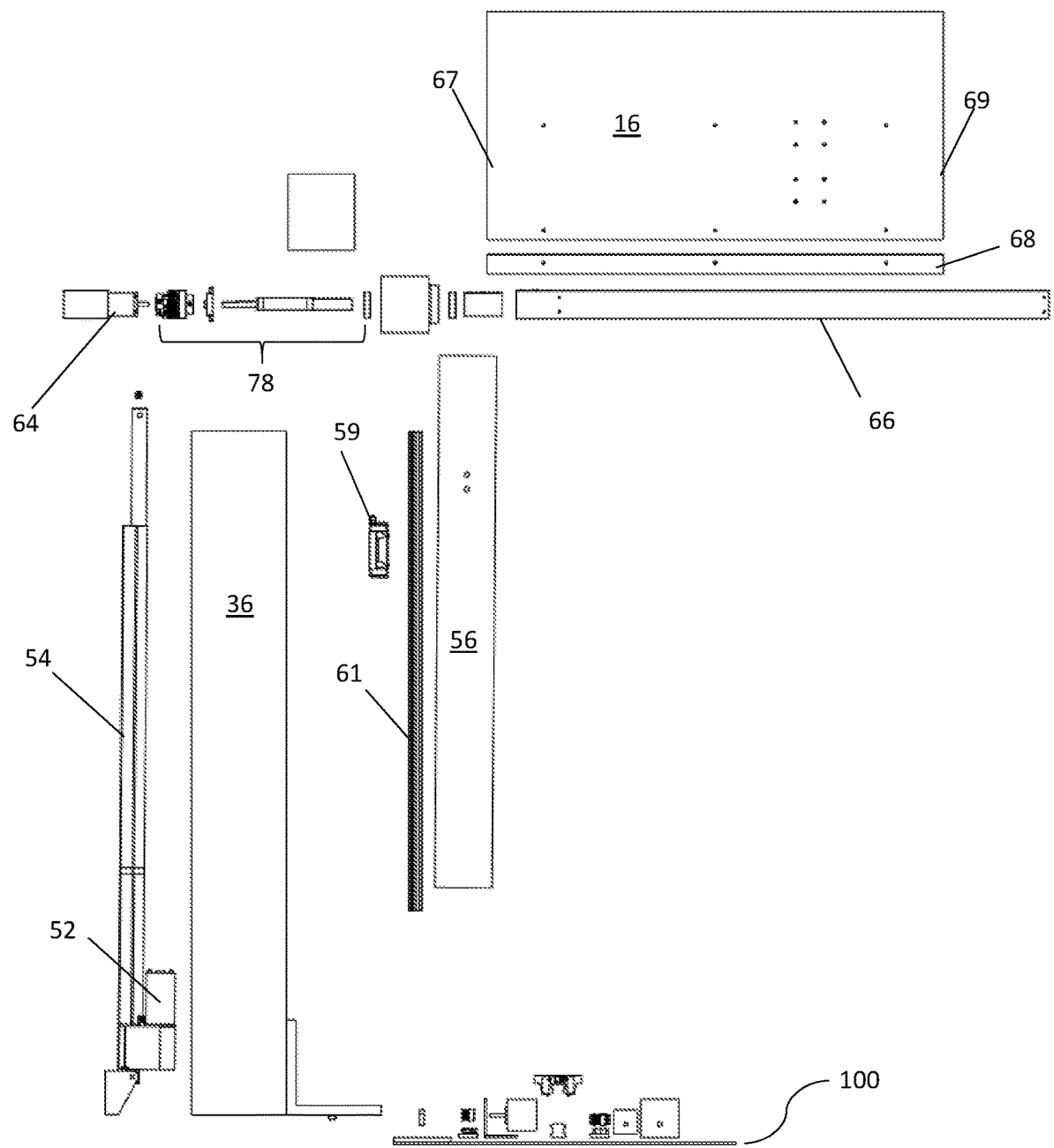
FIG. 6B is an exploded view of an exemplary embodiment of the overbed table apparatus of the present disclosure including a linear actuation system.
Figure 6C:
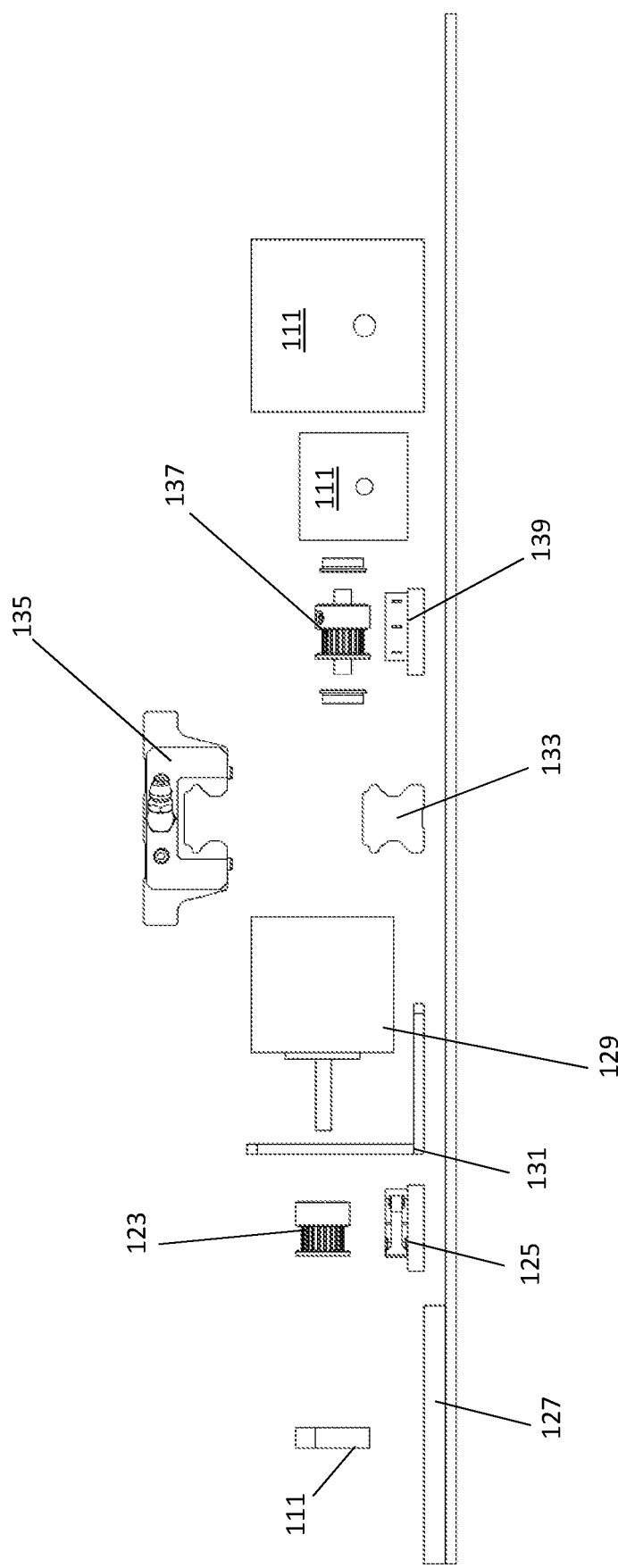
FIG. 6C is an exploded view an exemplary embodiment of the linear actuation system of the present disclosure.
Figure 6D:
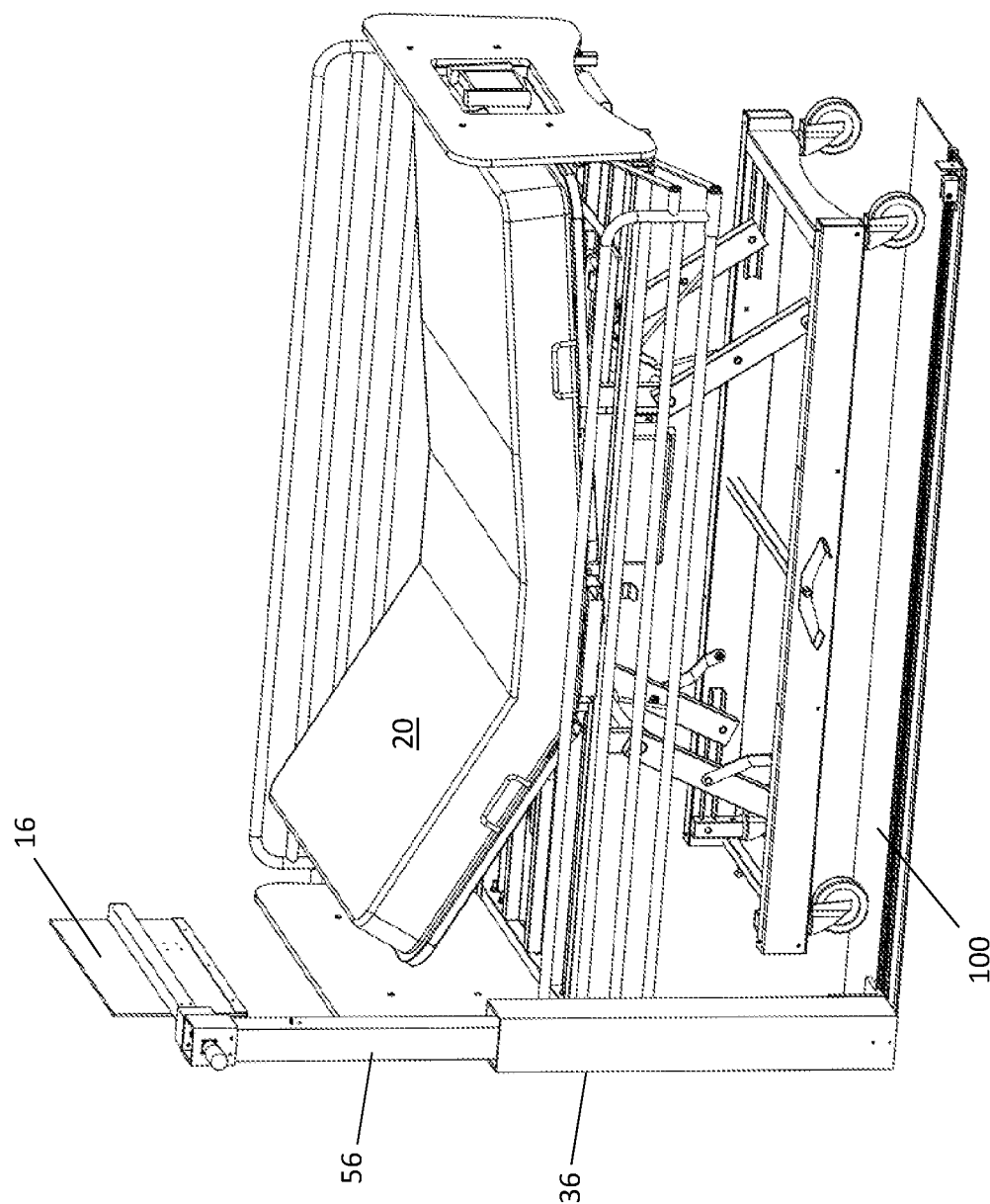
FIG. 6D is an illustration of an exemplary embodiment of the overbed table apparatus of the present disclosure in an environment in a stored position.
Figure 6E:
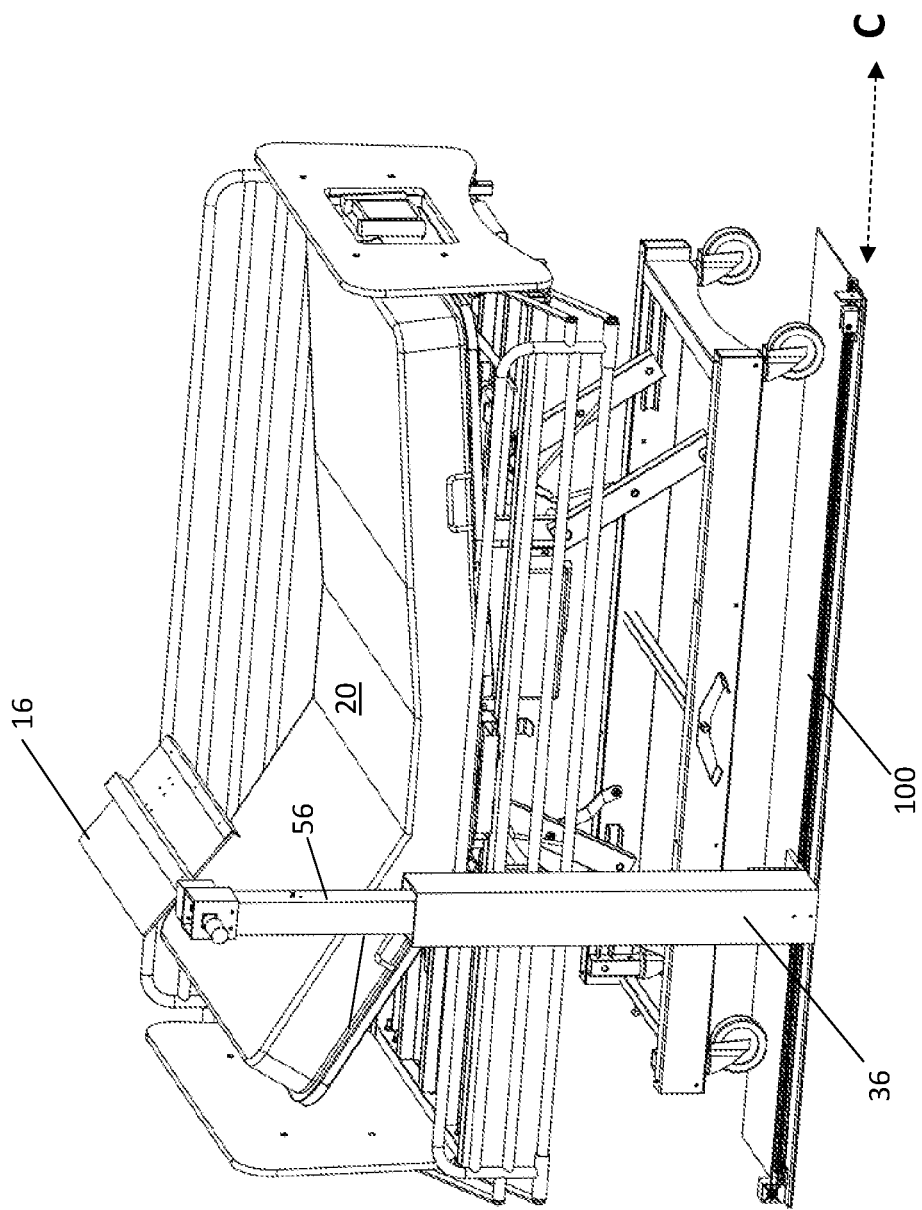
FIG. 6E is an illustration of an exemplary embodiment of the overbed table apparatus of the present disclosure in an environment in a displayed position.

As shown in FIG. 6C, the linear actuator system 100 can include a timing belt 121, a belt pulley 123, belt pully limit switch 125, baseplate 127, motor 129 and mount 131, linear rail 133 and bearing 135, a belt tensioner 137, and belt tensioner limit switch 139. The second arm 36 can be removeably coupled to the linear actuator system, wherein the second arm 36 extends in a perpendicular direction to the linear rail 133 of the linear actuator system 100. The system 100 can use one or more mounting members 111. The linear actuator system allows for the second arm 36 to travel along a linear axis of the linear rail 133. In some exemplary embodiments, the belt tensioner 137 can use any suitable means, such as a compression/extension/torsion spring to pull or push a belt for tensioning, ratcheting tensioner system, a weight, or pulley system.

The linear rail system 133 enables the second arm 36 to travel along a linear axis with low friction. The linear axis could be constrained by the use of at least one square rail, profile guide rail, round linear shaft, telescoping/drawer slides, track and roller, and a low friction shaft or tube. The second arm 36 can be mounted on linear ball bearings, linear roller bearings, rollers/wheels, or linear sleeve bearings/bushings to achieve low friction. Two linear rails could be used for the linear axis to better resist the moment arm of the cantilevered table surface and increase the stiffness of the linear guide. The belt tensioner 137 can tighten the flat belt 121 belt, or timing belt to achieve sufficient belt tension for the motor 129 to move the second arm 36 along the linear guide axis. The motor 129 can have sufficient torque to be able to move the system along the linear axis, such as axis C via the belt 121. Additionally, the motor can also be back driveable and the linear rail can have low friction so allow a user to manually move the second arm in an emergency if the second arm 36 needs to be moved away quickly (i.e. if a patient in a medical bed requires urgent attention). Safety sensors 103 can be included on the second arm to ensure that the device will not harm bystanders while moving the second arm 36 along the linear guide.

The various motor assemblies can incorporate a torque/force limiting devices 78 (i.e. discrete torque limiter/clutch or a spring) that can provide the apparatus 10 additional safety features. Similarly, the sensors 103 communicatively coupled to the motor drives 105 and actuators to sense current/impedance to limit force and torque if the apparatus 10 contacts something within the environment. Contact or proximity sensors 103 can also be attached at various locations on the mechanism to avoid or minimize contact with the user, bystanders, or the environment.

Figure 7A:
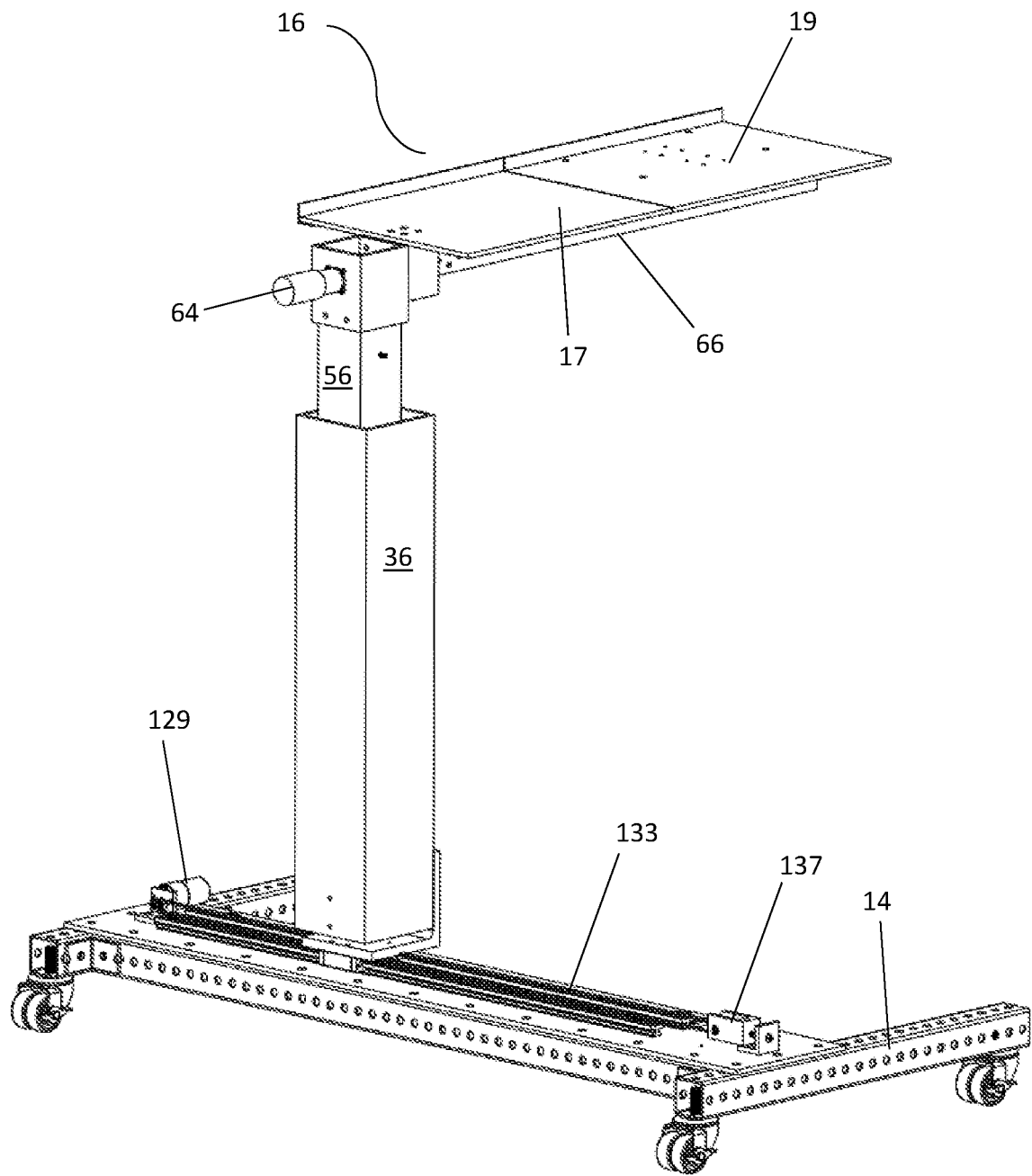
FIG. 7A is a perspective view of an exemplary embodiment of the overbed table apparatus of the present disclosure including a linear actuation system on a moveable base having a split table portion with the two portion is the same position.
Figure 7B:
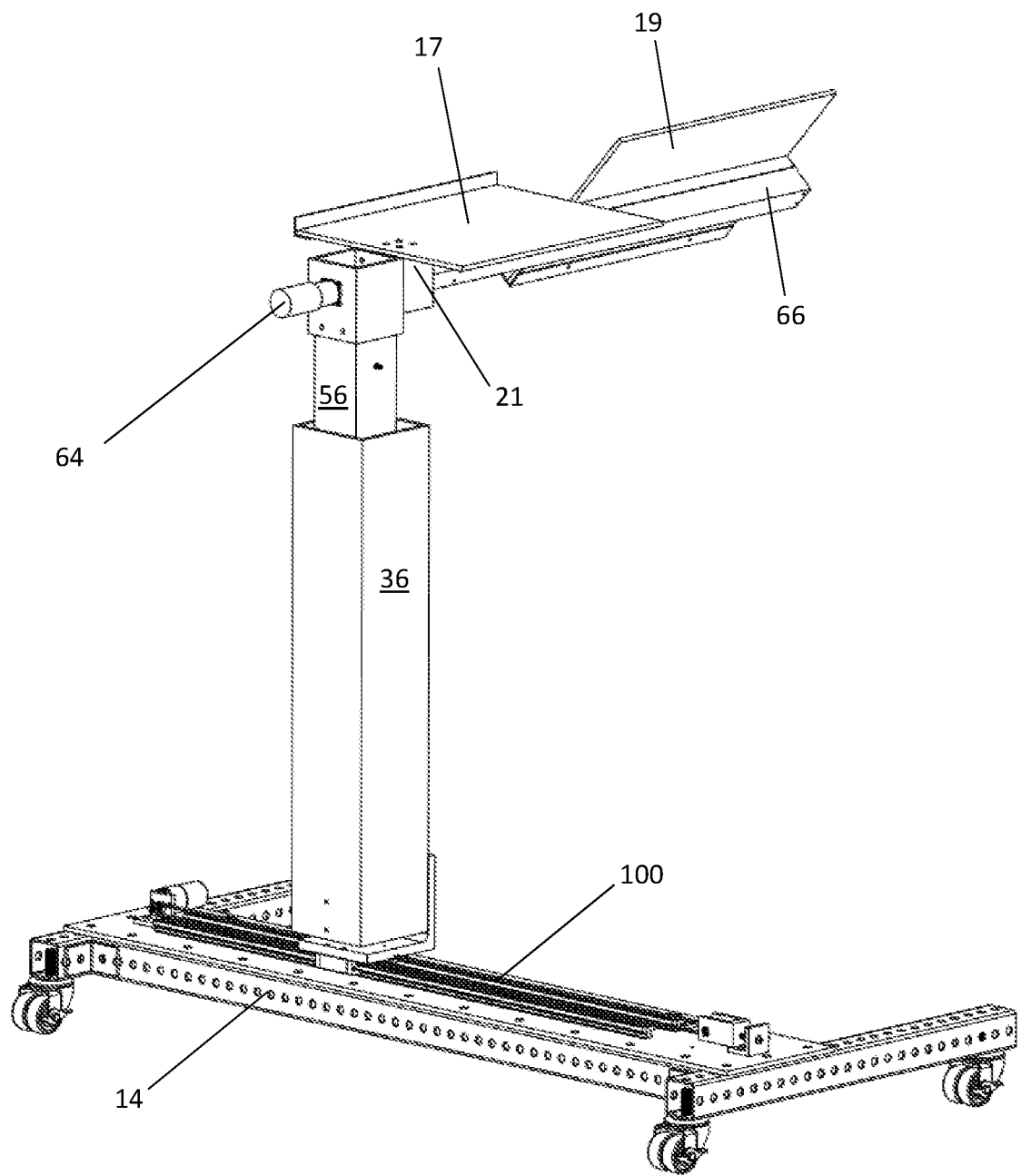
FIG. 7B is a perspective view of an exemplary embodiment of the overbed table apparatus of the present disclosure including a linear actuation system on a moveable base having a split table portion with the moveable portion at a reclining position.
Figure 8A:
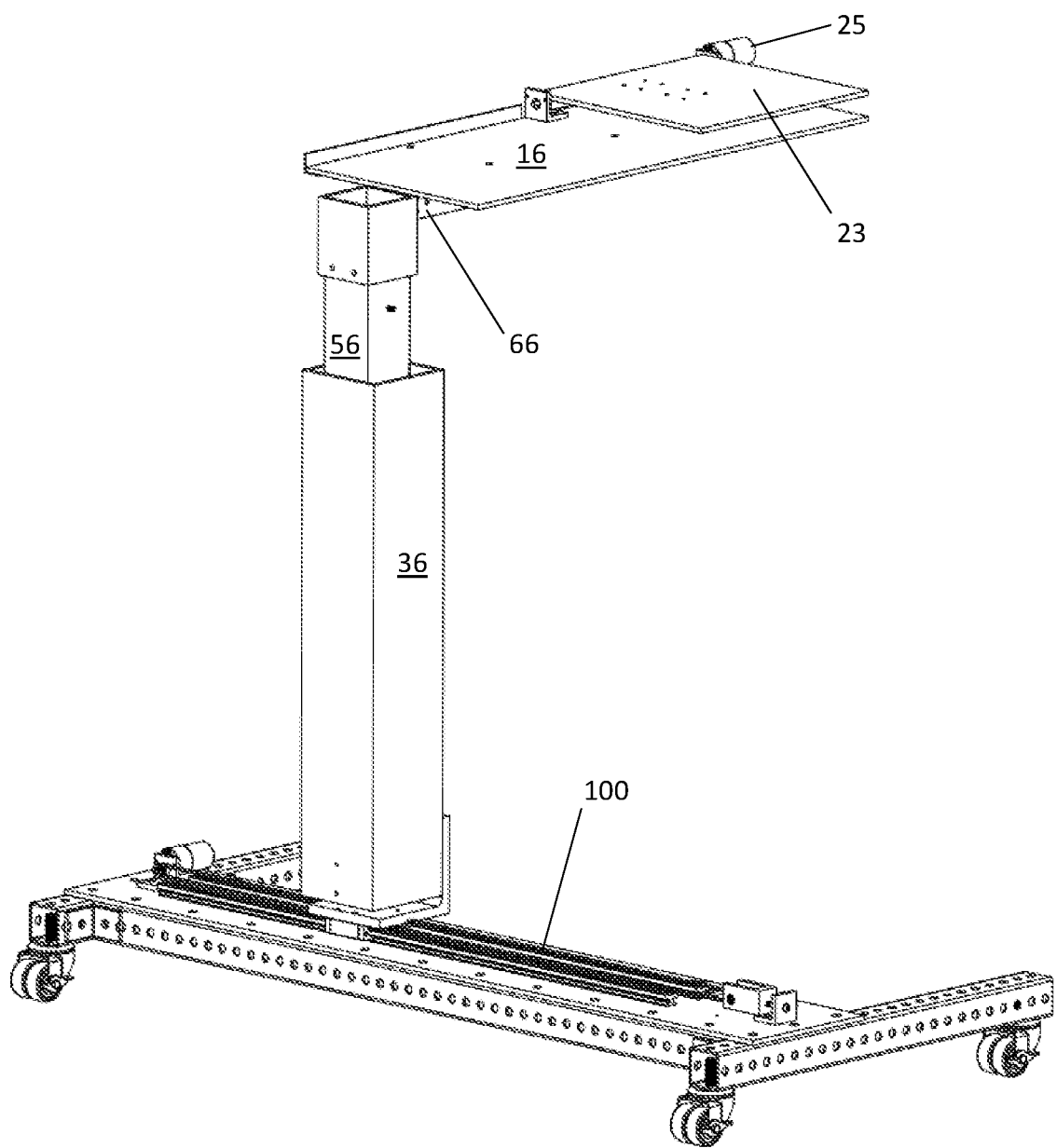
FIG. 8A is a perspective view of an exemplary embodiment of the overbed table apparatus of the present disclosure including a linear actuation system on a moveable base having a rotatable table portion in a flat position.
Figure 8B:
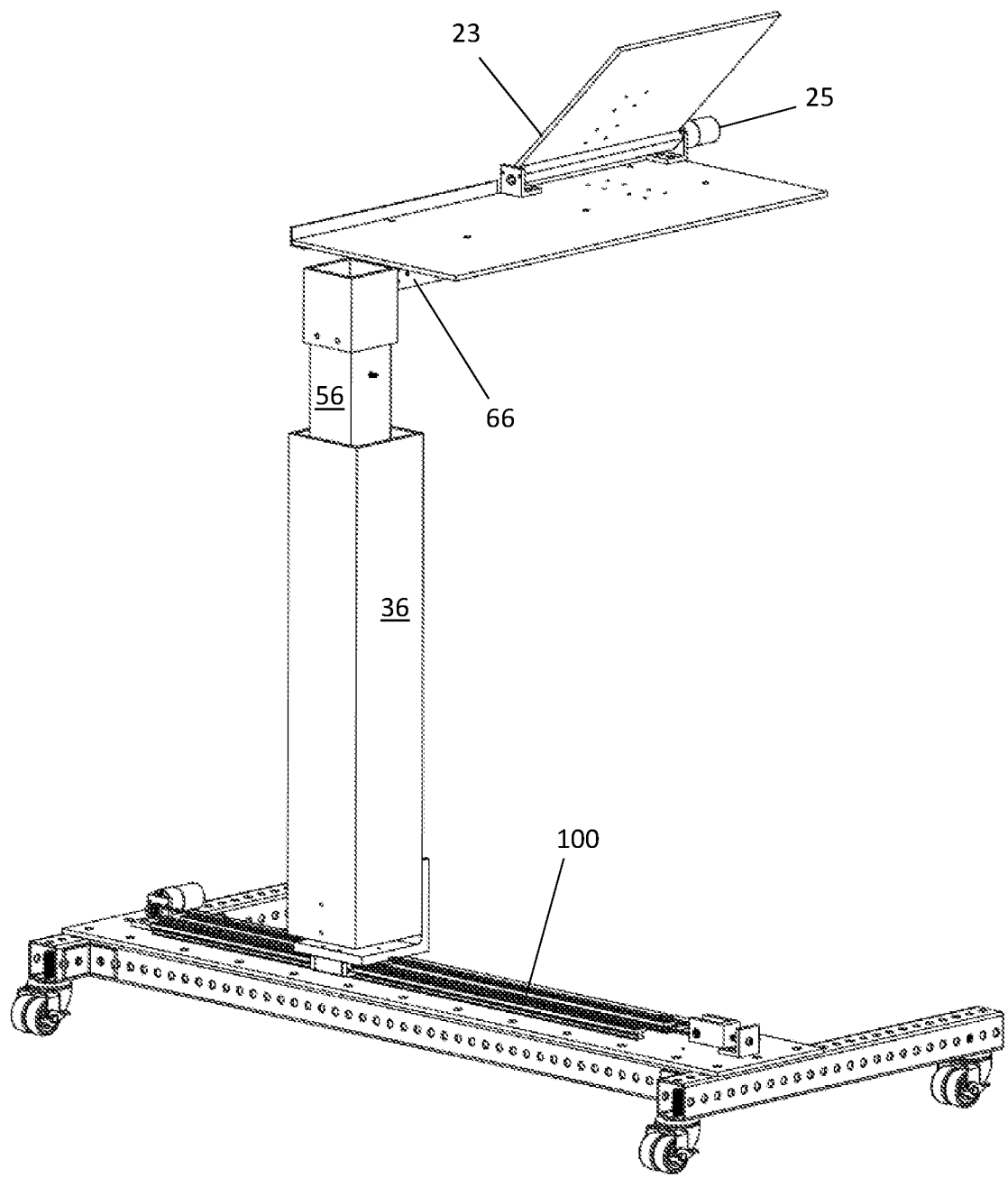
FIG. 8B is a perspective view of an exemplary embodiment of the overbed table apparatus of the present disclosure including a linear actuation system on a moveable base having a rotatable table portion in a reclining position.
Figure 9A:
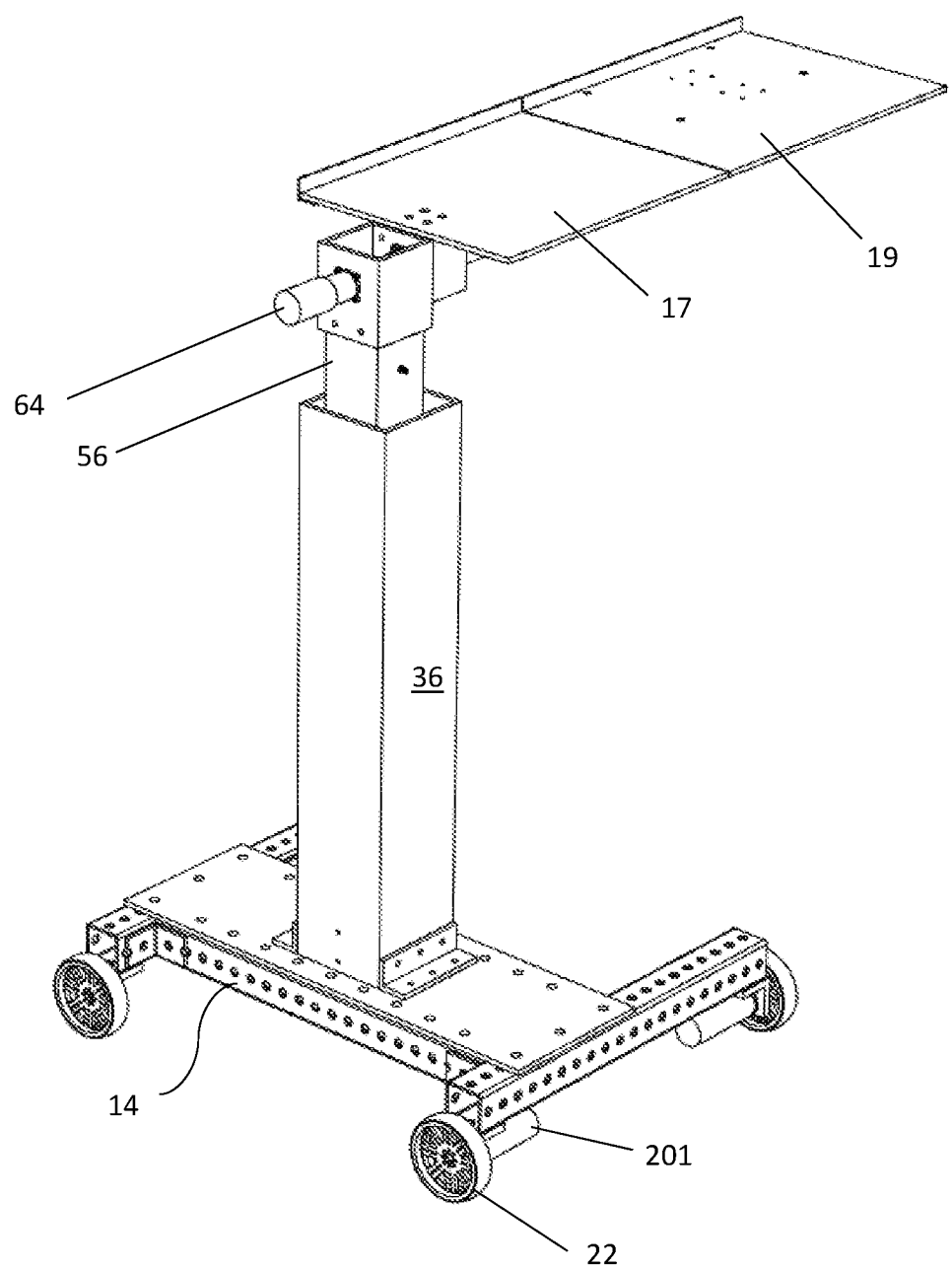
FIG. 9A is a perspective view of an exemplary embodiment of the overbed table apparatus of the present disclosure including motorized wheelbase.
Figure 9B:
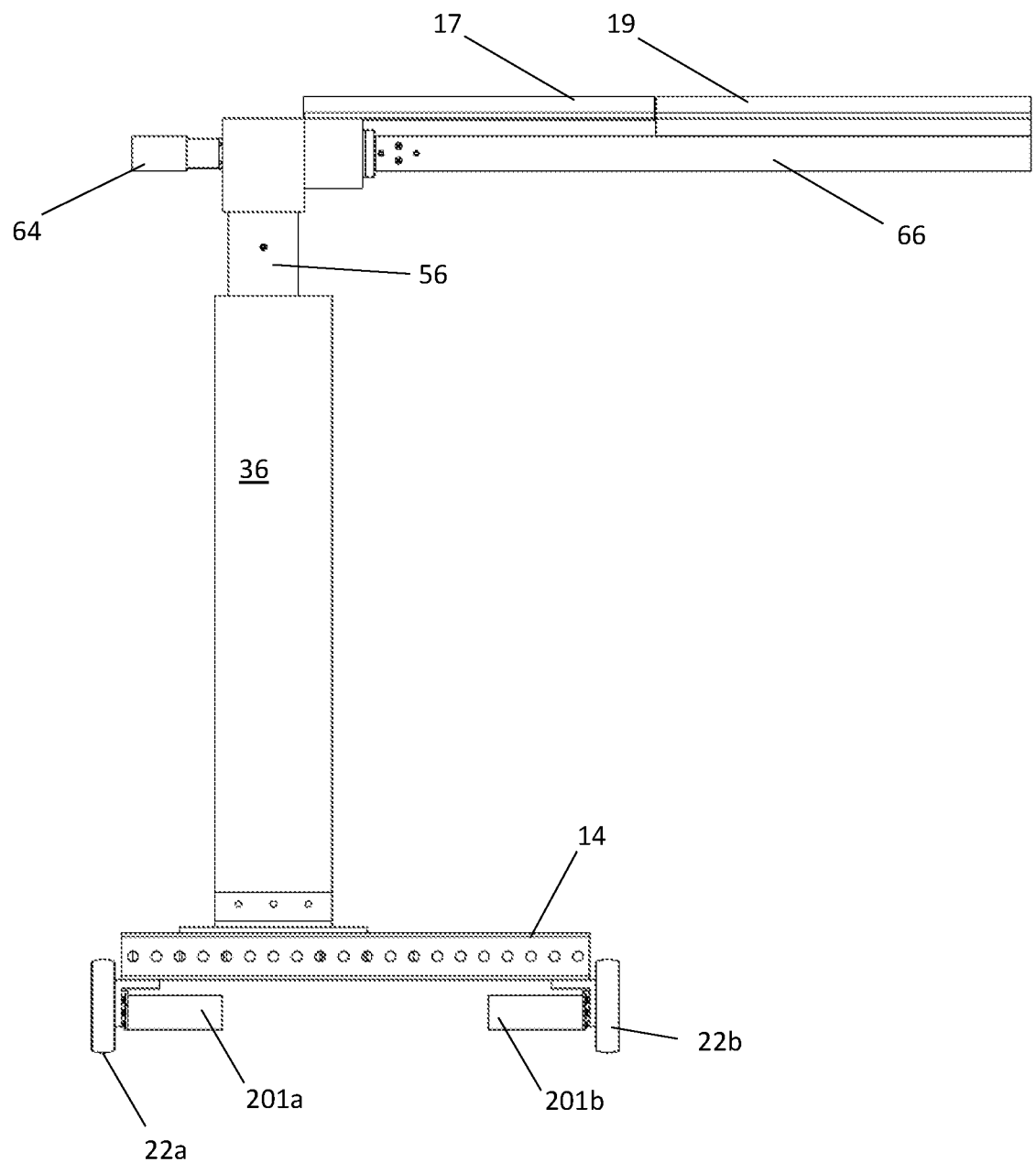
FIG. 9B is a front view of an exemplary embodiment of the overbed table apparatus of the present disclosure including motorized wheelbase.
Figure 9C:
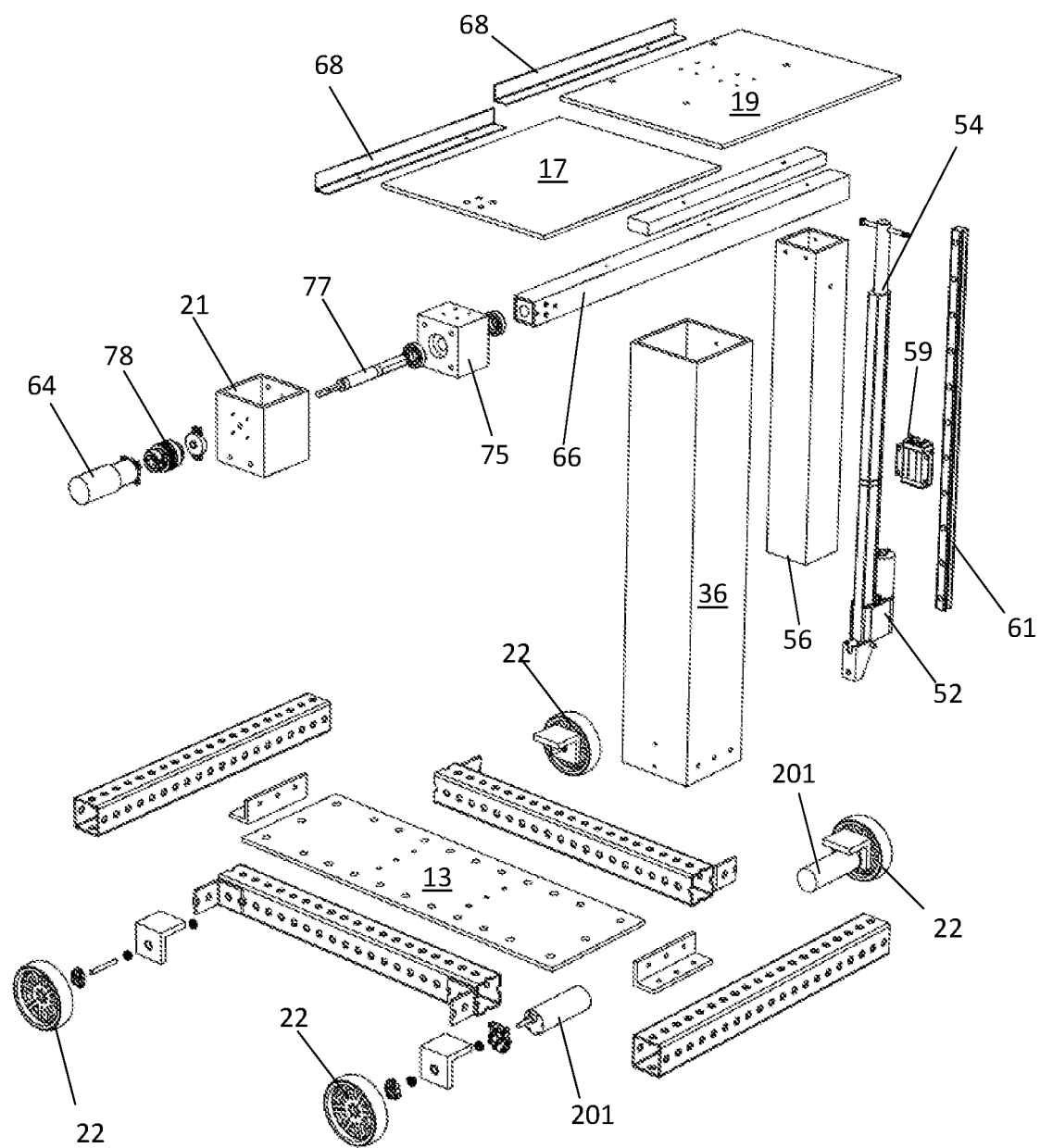
FIG. 9C is an exploded view of an exemplary embodiment of the overbed table apparatus of the present disclosure including motorized wheelbase.

In another embodiment, the linear rail embodiment of the OBT 10 can be coupled to a mobility base 14 as shown in FIGS. 7A-B and FIGS. 8A-B. This embodiment is similar in nature to that illustrated in FIGS. 6A-E, except the linear rail system 100 and the second arm 36 are mounted to a mobility base 14, as shown in FIG. 7A. The mobility base 14 can include a plurality of wheels 22. In some exemplary embodiments, as shown in FIGS. 9A-C, the mobility base 14 can be a motorized mobility base, wherein in one or more of the wheels is coupled to a motor 201 to turn the one or more wheels. The motorized wheels 22 could use normal wheels or omni-directional wheels to move the base along the length of the bed for enhanced independence. The wheels can be configured to move the OBT anywhere in the room in a 2D x or y plane through translation and rotation. In one exemplary embodiment, the motorized mobility base 14 includes at least two motorized wheels or a steerable wheel for rotation. The motorized mobility base could be used instead of a floor-mounted rail system, which may be bulky and difficult to roll other devices over the floor-mounted rail or mobile base-mounted rail system. The mobility base can include several components such as a base member 13 that can be used as a mounting point for the second arm 36, rail system 100, or the first arm 34. In some embodiments, the mobility base can have numerous support members couple together to form the shape and external frame of the mobility base 14.

In one exemplary embodiment, the table portion 16 can include a first portion 17 and a second portion 19 as shown in FIGS. 7A-7B. Each of the first and second table portions can include an integrated or coupled lip portion 68 respectively as shown in FIG. 9C In some exemplary embodiments, the first portion of the table can be maintained in a fixed position, while the second portion 19 of the table may be able to rotate around an axis and moveable between multiple positions using the motor 64. The first portion 17 of the table can be mounted to a bracket or directly to a base member 21 on the end of the extension portion 56 as shown in FIG. 7B. The second portion can rotate 360 degrees around the axis and into a desired position of a use. Similarly, as shown in FIG. 8A-B, the table portion can have a secondary desk portion 23 can be coupled to a motor 25 and rotate from flat (FIG. 8A) to about 180 degrees of freedom around an axis. The secondary desk portion 23, can be stopped at any desired position, such as a reclined position (FIG. 8B), desired by a user. In this embodiment, the table portion 16 can be affixed to the support arm 66.

While certain illustrative embodiments have been described in detail in the drawings and the foregoing description, such an illustration and description are to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure.

What is claimed is:
1. An overbed table apparatus comprising:
a first arm comprising an extension portion configured to move along a first axis;
an end effector coupled to the extension portion, wherein the end effector has a first end and a second end, wherein the end effector is perpendicularly oriented with respect to the orientation of the first arm;
a first motor assembly configured to actuate a first actuator, wherein the first end of the first actuator is coupled to a first end of the first arm and the second end of the first actuator is coupled to the extension portion, wherein the first motor assembly and first actuator are configured to move the extension portion along a first axis;
a second motor assembly configured to rotate the end effector 360 degrees around a second axis, wherein the second axis is a horizontal axis;
a control system communicatively coupled to the first motor assembly and the second motor; and
a motorized mobility base, wherein the first arm is coupled to the motorized mobility base, wherein the motorized mobility base comprises:
a plurality of wheels,
a first wheel motor coupled to a first wheel of the plurality of wheels,
a second wheel motor coupled to a second wheel of the plurality of wheels,
wherein the first wheel motor and second wheel motor are communicatively coupled to the control system, and the first motor turns the first wheel and the second motor turns the second wheel.

2. The apparatus of claim 1, wherein the control system includes a microprocessor and memory.

3. The apparatus of claim 2, wherein the memory is configured to store at least one pre-determined position of the table.

4. The apparatus of claim 3, wherein the control system further comprises: a microcontroller;
a motor driver; and
at least one sensor system communicatively coupled to the control system.

5. The apparatus of claim 4, wherein the sensor system can be comprised of one or more IR break beam sensors and IR reflectors.

6. The apparatus of claim 4, wherein the sensor system can include at least one of the following: a contact sensor, an IR sensor, or a proximity sensor.

7. The apparatus of claim 1, wherein the mobility base further includes one or more motors corresponding to at least one wheel, wherein the first wheel motor are configured to drive the first wheel and the second wheel motor is configured to drive the second wheel.

8. The apparatus of claim 5, wherein the IR break beam sensor is communicatively coupled to the control system and configured to prevent or stop the movement of the end effector when the beam is not reflected back to the IR break beam sensor.

9. The apparatus of claim 1, wherein at least a portion of the extension portion is housed within the first arm.

10. An overbed table apparatus comprising:
a steerable motorized wheelbase;
a first arm coupled to the motorized wheelbase system, comprising an extension portion configured to move along a first axis;
an end effector coupled to the extension portion, wherein the end effector is perpendicularly oriented from the first arm;
a first motor assembly configured to actuate a first actuator, wherein the first end of the first actuator is coupled to a first end of the first arm and the second end of the first actuator is coupled to the extension portion, wherein the first motor assembly and first actuator are configured to move the extension portion along an axis;
a second motor assembly configured to rotate the end effector 360 degrees around a horizontal axis; and
a control system communicatively coupled to the first motor assembly, the second motor, and the steerable motorized wheelbase.

11. The apparatus of claim 10, wherein the control system includes a microprocessor and memory, wherein the memory is configured to store at least one-pre-determined position of the table, a microcontroller, and a motor driver.

12. The apparatus of claim 11, further comprising at least one sensor system communicatively coupled to the control system.

13. The apparatus of claim 12, wherein the sensor system is an IR break beam sensor system, wherein the IR break beam sensor is communicatively coupled to the control system and configured to prevent or stop the movement of the end effector.

14. The apparatus of claim 12, wherein the sensor system is a contact sensor, wherein the end effector is prevented from further movement upon contacting a user.

* * * * *